(12) United States Patent
Shumsker et al.

(10) Patent No.: US 10,305,863 B2
(45) Date of Patent: May 28, 2019

(54) SYSTEMS AND METHODS FOR MANAGING TELECOMMUNICATIONS

(71) Applicant: Cronvo LLC, North Miami Beach, FL (US)

(72) Inventors: Marc Evan Shumsker, North Miami Beach, FL (US); Christopher Coleman Trabue, Coral Springs, FL (US); Victor Leone, Hanover, MD (US)

(73) Assignee: Cronvo LLC, North Miami Beach, FL (US)

( * ) Notice: Subject to any disclaimer, the term of this patent is extended or adjusted under 35 U.S.C. 154(b) by 0 days.

(21) Appl. No.: 15/885,595

(22) PCT Filed: Aug. 4, 2016

(86) PCT No.: PCT/US2016/045632
§ 371 (c)(1),
(2) Date: Jan. 31, 2018

(87) PCT Pub. No.: WO2017/024172
PCT Pub. Date: Feb. 9, 2017

(65) Prior Publication Data
US 2018/0227273 A1 Aug. 9, 2018

Related U.S. Application Data

(60) Provisional application No. 62/201,389, filed on Aug. 5, 2015.

(51) Int. Cl.
*H04L 29/06* (2006.01)
*H04W 28/02* (2009.01)
(Continued)

(52) U.S. Cl.
CPC ........ *H04L 63/0421* (2013.01); *H04L 67/141* (2013.01); *H04M 1/72563* (2013.01);
(Continued)

(58) Field of Classification Search
None
See application file for complete search history.

(56) References Cited

U.S. PATENT DOCUMENTS 7,412,492 B1 8/2008 Waldspurger
9,858,405 B2 * 1/2018 Ranadive ................ G06F 21/34
(Continued)

OTHER PUBLICATIONS

"Chatous" https://chatous.com/#.
(Continued)

*Primary Examiner* — Trang T Doan
(74) *Attorney, Agent, or Firm* — Foley & Lardner LLP

(57) ABSTRACT

Systems and methods of the present disclosure are directed to a telecommunications management system (TMS) that receives an indication from a first user to participate in a telecommunication. The TMS can identify a characteristic of the first user and compare the characteristic with one or more characteristics of each user of a pool of users. The TMS can select, based on the comparison, a second user of the pool of users that matches the first user. The TMS can initiate, responsive to selecting the matching second user, an anonymous telecommunications channel between the first user and the second user.

20 Claims, 10 Drawing Sheets

(51) Int. Cl.
*H04L 29/08* (2006.01)
*H04M 1/725* (2006.01)
*H04M 3/22* (2006.01)
*H04M 3/42* (2006.01)
*H04M 3/436* (2006.01)

(52) U.S. Cl.
CPC ..... *H04M 3/2281* (2013.01); *H04M 3/42008* (2013.01); *H04M 3/436* (2013.01); *H04W 28/0215* (2013.01); *H04L 63/08* (2013.01)

(56) References Cited

U.S. PATENT DOCUMENTS

| | | | |
|---|---|---|---|
| 2006/0288099 | A1 | 12/2006 | Jefferson et al. |
| 2008/0088698 | A1* | 4/2008 | Patel ............... H04N 7/15 348/14.09 |
| 2008/0304644 | A1* | 12/2008 | Mishra ............ H04L 29/06027 379/201.12 |
| 2010/0022225 | A1* | 1/2010 | Benger ............. G06Q 10/109 455/414.1 |
| 2010/0241748 | A1* | 9/2010 | Ansari .............. G06Q 30/04 709/225 |
| 2011/0103357 | A1* | 5/2011 | Chandrasekaran ... H04L 63/107 370/338 |
| 2011/0188457 | A1 | 8/2011 | Shu et al. |
| 2015/0154646 | A1* | 6/2015 | Mishra .............. G06Q 50/24 705/3 |
| 2017/0104763 | A1* | 4/2017 | Jain ................. G06F 21/36 |

OTHER PUBLICATIONS

"Parlor—Social Talking App" Copyright 2018 Google, https://play.google.com/store/apps/details?id=me.parlor.
"Talk Monster: Fun Live Calls", copyright 2018, Apple Inc. https://itunes.apple.com/us/app/talk-monster-fun-live-calls/id1158280659?mt=8.
"Wakie: Millions of People Connect with the right one for any question, Moment or Life Situation" https://wakie.com/.
"Yik Yak" Feb. 4, 2018, https://en.wikipedia.org/wiki/Yik_Yak.
The International Search Report and The Written Opinion of The International Search Authority for Application PCT/US2016/045632 dated Aug. 4, 2016.

* cited by examiner

SYSTEMS AND METHODS FOR MANAGING TELECOMMUNICATIONS

CROSS-REFERENCES TO RELATED APPLICATIONS

This application claims priority to, and the benefit of, International Patent Application No. PCT/US2016/045632, filed Aug. 4, 2016, which claims priority to, and the benefit of, U.S. Provisional Patent Application No. 62/201,389, filed Aug. 5, 2015, each of which are incorporated wherein by reference in their entirety.

FIELD OF THE DISCLOSURE

The present solution is generally directed to managing telecommunications. In particular, the present solution selects two computing devices based on selection criteria and initiates a telecommunications channel between the two computing devices.

BACKGROUND OF THE DISCLOSURE

Individuals may communicate with one another via phone calls, text messages, electronic mail ("e-mail") or other communication techniques. For example, a first individual may input a phone number or e-mail address into a communication device to communicate with a second individual associated with the phone number or the e-mail address. However, challenges arise when attempting to communicate about a certain topic with unknown individuals.

BRIEF SUMMARY OF THE DISCLOSURE

Systems and methods of the present solution are directed to managing telecommunications. In particular, systems and methods of the present solution provide a telecommunications management system ('TMS") that can match two or more users based on certain criteria and anonymously initiate a telecommunication channel between telecommunication devices of the users. The TMS can be configured with various features to facilitate managing the telecommunications channel. For example, the TMS may use a feedback mechanism to rate the users of the telecommunications channel; generate categories of telecommunications channels (e.g., sports, music, a specific artist, topic, article, online document, blog, online post, post in a social network); configure a mode of the telecommunications channel (e.g., duration, privacy, listen only); or select an optimum network interface with which to initiate the telecommunications channel.

At least one aspect is directed to a method for managing telecommunications. The method can be performed by one or more processors executing on a TMS. In some embodiments, the TMS receives an indication from a first user to participate in a telecommunication. The TMS can identify a characteristic of the first user and compare the characteristic with one or more characteristics of each user of a pool of users. The TMS can select, based on the comparison, a second user of the pool of users that matches the first user. The TMS can initiate, responsive to selecting the matching second user, an anonymous telecommunications channel between the first user and the second user.

Another aspect is directed to a method of managing telecommunications in which the one or more processors of the TMS can select a network interface for the telecommunications channel. In some embodiments, the TMS can receive an indication to initiate a communication channel between a first user device and a second user device. The TMS can identify a first plurality of available network interfaces of the first user device, and a second plurality of available network interfaces of the second user device. The TMS can determine, using a heuristic technique, a first available network interface of the first plurality of available network interfaces and a second available network interface of the second plurality of available network interfaces that satisfy a telecommunications metric. The TMS can initiate a telecommunications channel between the first user device and the second user device using the determined first and second available network interfaces. The TMS can initiate this telecommunication channel responsive to the determination.

Yet another aspect is directed to a method of managing telecommunications in which the TMS configures a telecommunications channel for a category. In some embodiments, the TMS can receive an indication to generate a category. The TMS can crawl one or more online documents for a tag to identify the category, or the TMS can identify the category based on information associated with the received indication to generate a category. The TMS can determine that at least two user devices are interested in communicating about the category. The TMS can initiate, responsive to the determination, a telecommunications channel configured for the identified category.

Yet another aspect is directed to a method of managing telecommunications in which the TMS can configure a telecommunications channel in a listen only mode. The TMS can receive an indication to terminate a telecommunication channel between a first user device and a second user device. The TMS can receive, from the second user device upon termination of the telecommunications channel, feedback for the first user device. The TMS can update, using the feedback, a metric of the first user profile of the first user. The TMS can compare the updated metric of the first user profile with a threshold to determine that the first user satisfies the threshold. The TMS can configure, responsive to the determination, a telecommunications channel for the first user for listen only mode.

Yet another aspect is directed to a method of managing telecommunication channels to reduce resource consumption. The method can include the TMS authenticating a first device responsive to receiving one or more credentials from the first device. The method can include the TMS receiving a request from the first device to participate in an anonymous telecommunication. The method can include the TMS identifying first one or more characteristics stored in a first configuration file for the first device. The method can include the TMS selecting from a pool of authenticated devices, a second device having second one or more characteristics stored in a second configuration file that matches the first one or more characteristics of the first device. The method can include the TMS initiating, responsive to selecting the second device, an anonymous telecommunication channel between the first device and the second device. The method can include the TMS configuring a timer with a duration parameter that causes the anonymous telecommunication channel to terminate upon expiration of the timer to reduce resource consumption. The timer can be reset to extend the anonymous telecommunication channel responsive to receiving an indication from both the first device and the second device. The method can include the TMS updating, upon termination of the anonymous telecommunication channel, the first configuration file for the first device and the second configuration file of the second device to tune the matching engine component.

In some embodiments, the TMS can provide a selectable prompt for display on both the first device and the second device. The TMS can receive a first indication from the first device to extend the anonymous telecommunication channel. The TMS can identify a second indication from the second device to terminate the anonymous telecommunication channel. The TMS can terminate, based on the second indication and the second indication, the anonymous telecommunication channel.

The TMS can configure the anonymous telecommunication channel to enable a listen-only mode to allow one or more devices of the pool of authenticated devices to listen to the anonymous telecommunication channel. The TMS can receive input from the second device upon termination of the anonymous telecommunication channel. The TMS can update the first configuration file for the first device based on the input from the second device.

The TMS can initiate a first telecommunication link between the telecommunication management system and the first device. The TMS can initiate a second anonymous telecommunication link between the telecommunication management system and the second device. The TMS can bridge the first telecommunication link and the second telecommunication link to establish the anonymous telecommunication channel.

The TMS can instruct an agent executing on the first device to communicate with an intermediary device different from the second device. The intermediary device can route communications with the first device to the second device to establish the anonymous telecommunication channel.

The TMS can remove the second device from the pool of authenticated devices responsive to initiating the anonymous telecommunication channel between the first device and the second device. The TMS can add the second device to a second pool of authenticated devices. The TMS can remove the second device from the pool of authenticated devices responsive to initiating the anonymous telecommunication channel between the first device and the second device. The TMS can maintain the second device in the second pool of authenticated devices during the anonymous telecommunication channel. The TMS can provide, during the anonymous telecommunication channel, a selectable prompt to the second device to initiate a second anonymous telecommunication channel with a third device of the second pool of authenticated devices. The TMS can terminate, responsive to receiving a selection via the selectable prompt, the anonymous telecommunication channel between the first device and the second device to initiate the second anonymous telecommunication channel between the second device and the third device.

The TMS can identify a plurality of available network interfaces for the first device. The TMS can select, for the anonymous telecommunication channel, a network interface of the plurality of available network interfaces that reduces resource consumption. The TMS can identify a first plurality of available network interfaces of the first device. The TMS can identify a second plurality of available network interfaces of the second device. The TMS can determine a first available network interface of the first plurality of available network interfaces and a second available network interface of the second plurality of available network interfaces that satisfy a telecommunications metric. The TMS can initiating, responsive to the determination, the telecommunications channel between the first device and the second device using the determined first and second available network interfaces.

Yet another aspect is directed to a system to manage telecommunication channels to reduce resource consumption. The system can include a telecommunication management system ("TMS") including a hardware processor. The TMS can include an authentication component to authenticate a first device responsive to receiving one or more credentials from the first device. The TMS can include an interface component to receive a request from the first device to participate in an anonymous telecommunication. The TMS can include a matching engine component to identify first one or more characteristics stored in a first configuration file for the first device. The matching engine component can select, from a pool of authenticated devices, a second device having second one or more characteristics stored in a second configuration file that matches the first one or more characteristics of the first device. The TMS can include a connection engine component to initiate, responsive to selection of the second device, an anonymous telecommunication channel between the first device and the second device. The connection engine component can configure a timer with a duration parameter that causes the anonymous telecommunication channel to terminate upon expiration of the timer to reduce resource consumption. The timer can reset to extend the anonymous telecommunication channel responsive to receiving an indication from both the first device and the second device. The matching engine component can be further configured to update, upon termination of the anonymous telecommunication channel, the first configuration file for the first device and the second configuration file of the second device to tune the matching engine component.

In some embodiments, the TMS can provide a selectable prompt for display on both the first device and the second device. The TMS can receive a first indication from the first device to extend the anonymous telecommunication channel. The TMS can identify a second indication from the second device to terminate the anonymous telecommunication channel. The TMS can terminate, based on the second indication and the second indication, the anonymous telecommunication channel.

The TMS can configure the anonymous telecommunication channel to enable a listen-only mode to allow one or more devices of the pool of authenticated devices to listen to the anonymous telecommunication channel. The TMS can receive input from the second device upon termination of the anonymous telecommunication channel. The TMS can update the first configuration file for the first device based on the input from the second device.

The TMS can initiate a first telecommunication link between the telecommunication management system and the first device. The TMS can initiate a second anonymous telecommunication link between the telecommunication management system and the second device. The TMS can bridge the first telecommunication link and the second telecommunication link to establish the anonymous telecommunication channel.

The TMS can instruct an agent executing on the first device to communicate with an intermediary device different from the second device. The intermediary device can route communications with the first device to the second device to establish the anonymous telecommunication channel.

The TMS can remove the second device from the pool of authenticated devices responsive to initiating the anonymous telecommunication channel between the first device and the second device. The TMS can add the second device to a second pool of authenticated devices. The TMS can remove the second device from the pool of authenticated devices responsive to initiating the anonymous telecommunication channel between the first device and the second device. The TMS can maintain the second device in the second pool of authenticated devices during the anonymous telecommunication channel. The TMS can provide, during the anonymous telecommunication channel, a selectable prompt to the second device to initiate a second anonymous telecommunication channel with a third device of the second pool of authenticated devices. The TMS can terminate, responsive to receiving a selection via the selectable prompt, the anonymous telecommunication channel between the first device and the second device to initiate the second anonymous telecommunication channel between the second device and the third device.

The TMS can identify a plurality of available network interfaces for the first device. The TMS can select, for the anonymous telecommunication channel, a network interface of the plurality of available network interfaces that reduces resource consumption. The TMS can identify a first plurality of available network interfaces of the first device. The TMS can identify a second plurality of available network interfaces of the second device. The TMS can determine a first available network interface of the first plurality of available network interfaces and a second available network interface of the second plurality of available network interfaces that satisfy a telecommunications metric. The TMS can initiating, responsive to the determination, the telecommunications channel between the first device and the second device using the determined first and second available network interfaces.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Like reference numbers and designations in the various drawings indicate like elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for managing telecommunication channels.

A. Computing and Network Environment

Figure 1A:
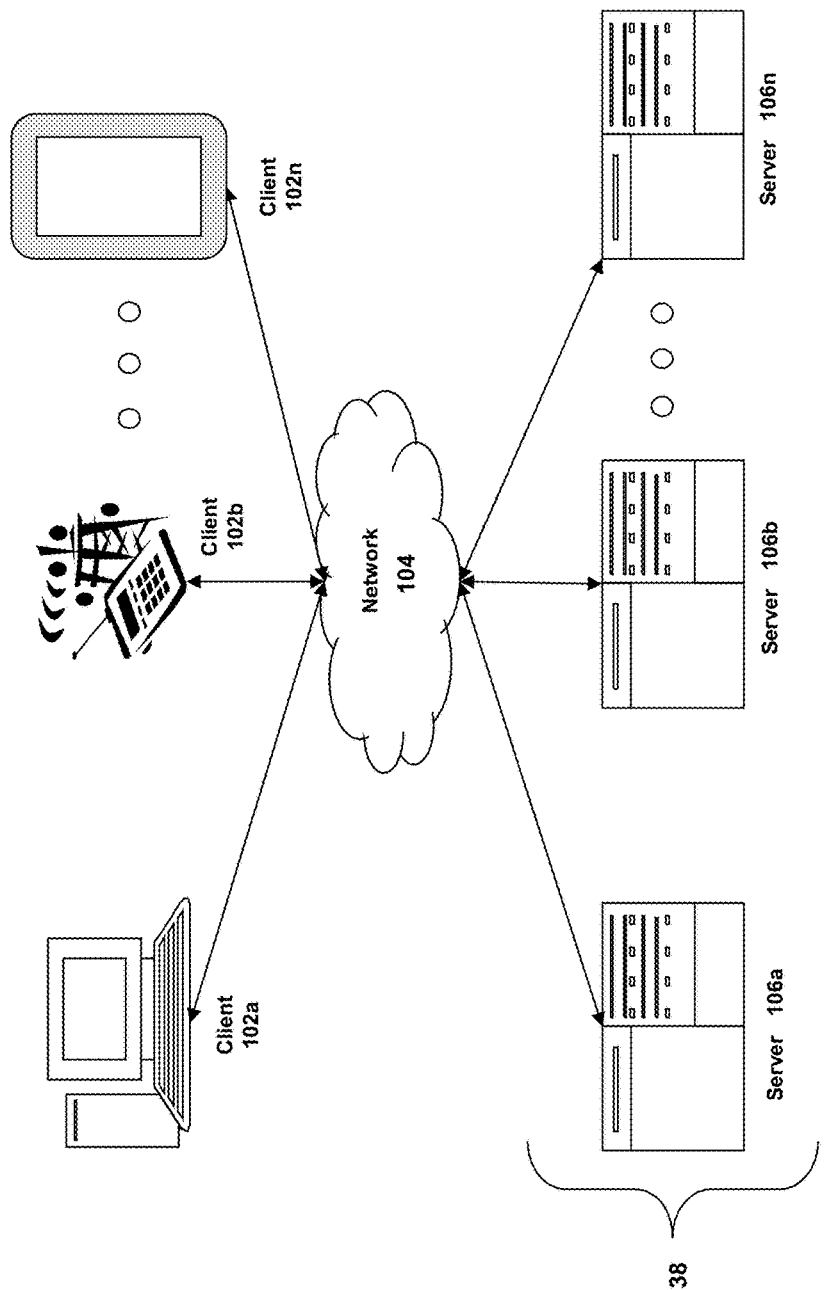
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as telecommunications device(s) 102, local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
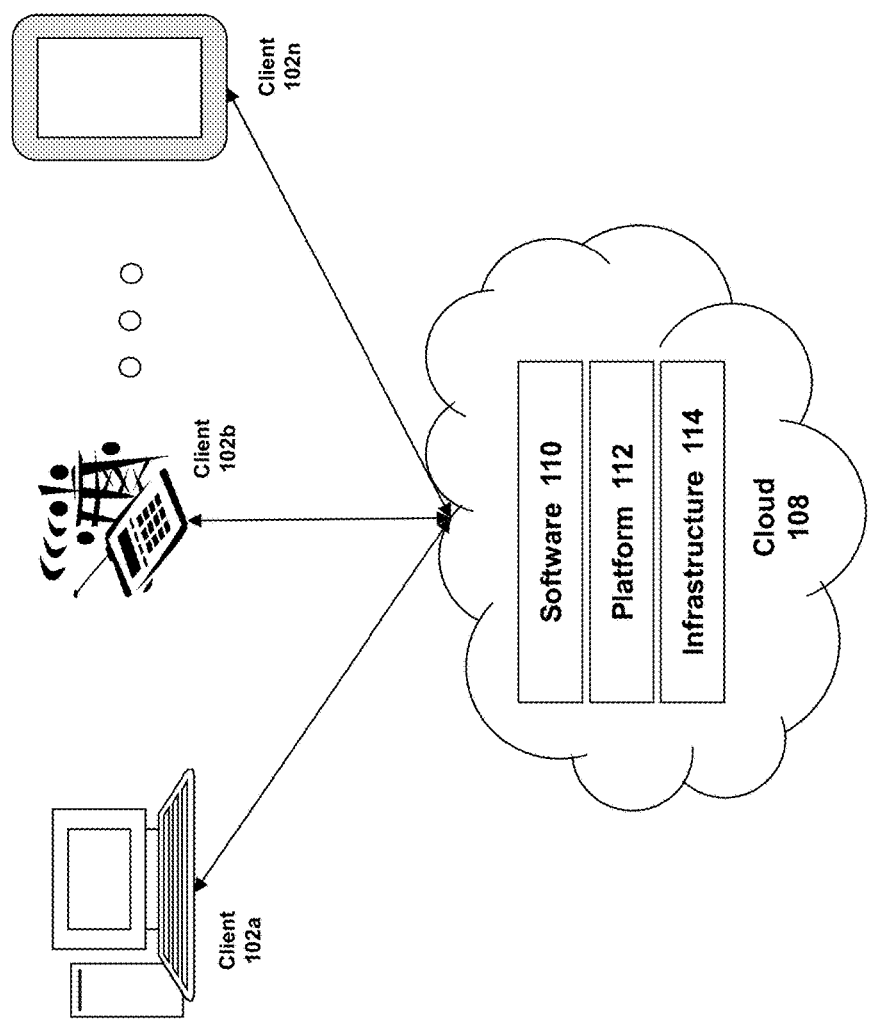
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
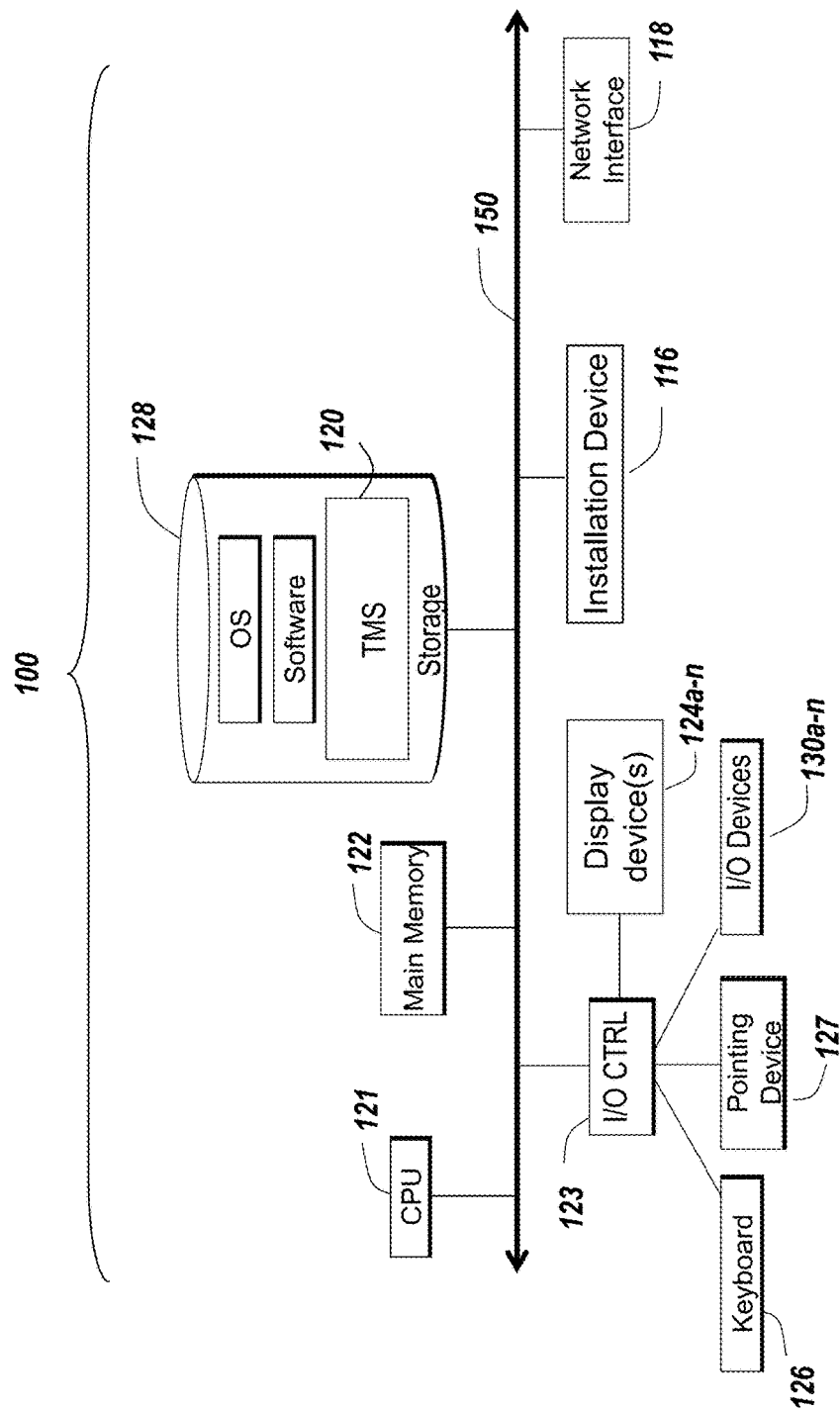
FIGS. 1C and 1D are block diagrams depicting embodiments of computing devices useful in connection with the methods and systems described herein.
Figure 1D:
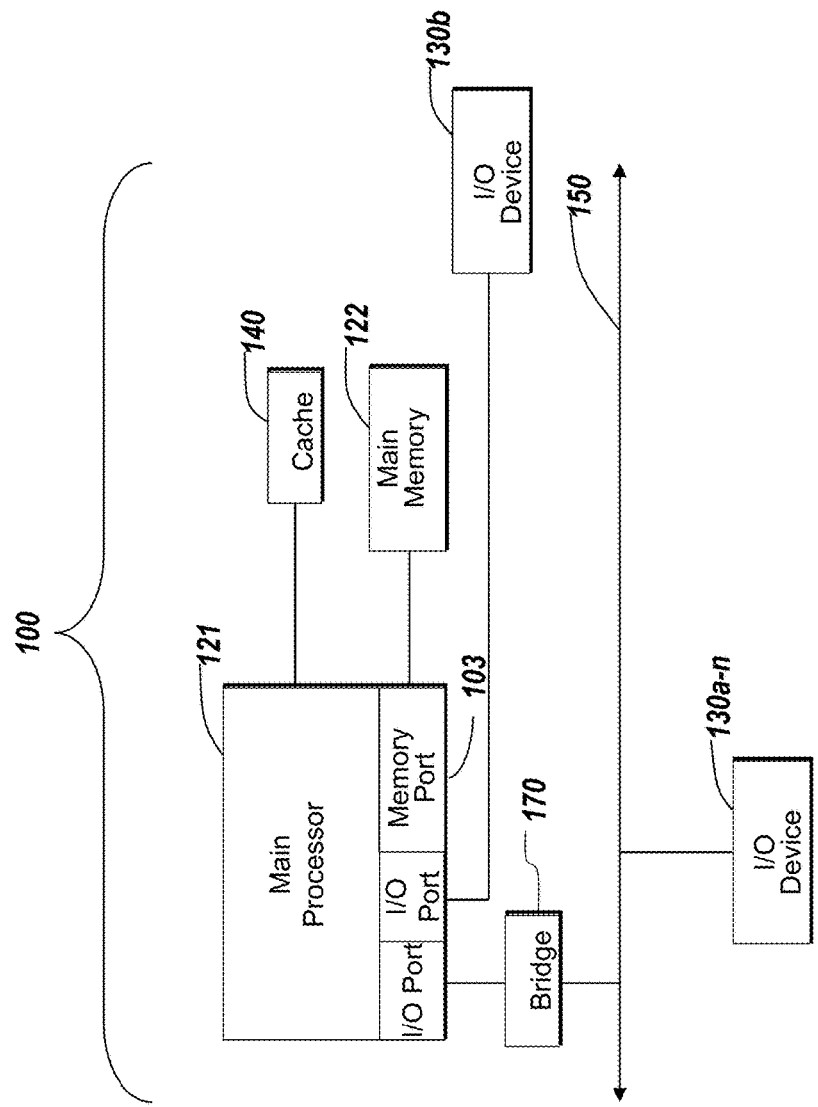

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a telecommunications management system (TMS) 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 can have a faster response time than main memory 122 and can be provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the telecommunications management system. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Operating systems can include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Telecommunications Management System

Systems and methods of the present solution are directed to providing a telecommunications management system (TMS) that can automatically initiate an anonymous telecommunications channel between two telecommunications devices. For example, a first user of a first telecommunications device (e.g., a smartphone), can provide an indication to the TMS that the first user is interested in participating in a conversation (e.g., via a graphical user interface, audio interface, gesture interface, motion interface, proximity interface). The TMS can receive the indication (e.g., via a network). The TMS can identify information about the first user, such as characteristics of the user or characteristics associated with the indication of interest in participating in the conversation (e.g., interests, hobbies, demographic information, or geographic information). The TMS may use this information to match the first user with a second user that is also interested in participating in a conversation. For example, the TMS may receive, from the second user, a similar indication of interest to participate in a conversation, identify information about the second user, and determine that the first user and the second user are a match for the purpose of the conversation. Upon determining that the first user and the second user are a match for a conversation, the TMS can automatically initiate an anonymous telecommunications channel between a first telecommunications device of the first user and a second telecommunications device of the second user. In some cases, the first and second telecommunications device may be the same device with which the first and second users provided the indications to the TMS, while in other cases they may be different telecommunications device (e.g., a first user may user a desktop computer to provide the indication of interest, and the TMS may initiate the telecommunications channel with a landline phone associated with the first user or otherwise identified by the first user).

The TMS can configure the telecommunications channel to be anonymous. For example, an anonymous telecommunications channel may refer to the TMS not providing a phone number or other unique identifier to the participants of the conversations. For example, the TMS may initiate the telecommunications channel directly with each of the first and second telecommunications devices, and then merge the telecommunications channel such that the first and second telecommunications devices do not receive identifying information of the other of the first and second telecommunications devices. By preserving anonymity in this manner, the TMS can facilitate providing a safe environment where users may not be repeatedly contacted or identified without voluntarily providing such information via other means.

The TMS can use this technique of matching users and initiating anonymous telecommunications channel to provide one or more features. For example, the TMS can identify a category or topic, and configure a telecommunications channel for the identified category or topic. Thus, users interested in the category or topic can indicate their interest to the TMS, and the TMS can match users for a conversation based on a shared interest in the category or topic. In some cases the TMS can identify a category based on a tag embedded in a web page or other online document. For example, a web site publisher may embed a tag on a web page and provide an indication to the TMS to crawl the web page for the tags. The TMS may crawl the web page, identify the tag, and create a category. Users of the TMS may search for available categories and indicate an interest in a category. The TMS may then match two or more users that indicated an interest in the category, and initiate a communications channel between telecommunications devices of the users.

When initiating the telecommunications channel, the TMS can, in some cases, select an optimum network interface for the telecommunications channel. For example, the TMS may identify one or more available network interfaces on the first telecommunications device and one or more available network interfaces on the second telecommunications device. The TMS may further evaluate characteristics of each of the available network interfaces to identify an optimal network interface (e.g., evaluating a characteristic by comparing it with a threshold or using a heuristic technique). In some cases, the TMS may choose the same network interface of each device participating in the telecommunications channel, while in other cases the TMS may select a different network interface for each participating telecommunications device. For example, the TMS may determine that a POTS phone call between the first and second telecommunications devices would be deemed to be a local call, as opposed to a long distance call. Based on this determination, the TMS may initiate the telecommunications channel using the available POTS interfaces. In another example, the TMS may determine that a POTS-based telecommunications channel would be deemed to be a long distance call. The TMS may further determine that each of the first and second telecommunications devices are connected to a network with bandwidth greater than a threshold (e.g., 1 Mb/s upload and download; 5 Mb/s download and 1 Mb/s upload, or another threshold based on the network interface). Thus, to avoid or reduce fees associated with a long distance POTS call, the TMS may initiate the telecommunications channel using a voice over IP (VoIP) protocol. In some cases, the TMS may use the available network interfaces to identify a match between a first user device and a second user device. For example, the cost of initiating and maintaining the telecommunications channel may be a factor in the matching process.

As the conversations made using the TMS terminate or come to an end, the participants of the conversation may provide feedback on the other party. The TMS may solicit feedback from the users, or may automatically determine feedback based on indications of feedback received/identified during or after the conversation. The indication of feedback can include, e.g., a duration of the call, number/duration of pauses in the call, volume level of the call, survey, rating or score provided by the participants, etc. The TMS may apply one or more scoring technique to the feedback to generate a user score or rating, or update a user's current score or rating. The TMS may use this score or rating to facilitate matching users, initiating categories, assigning expert status, determining a fee (currency or points-based) to use a feature of the TMS, or allocating points, tokens, or currency to a user.

Figure 2:
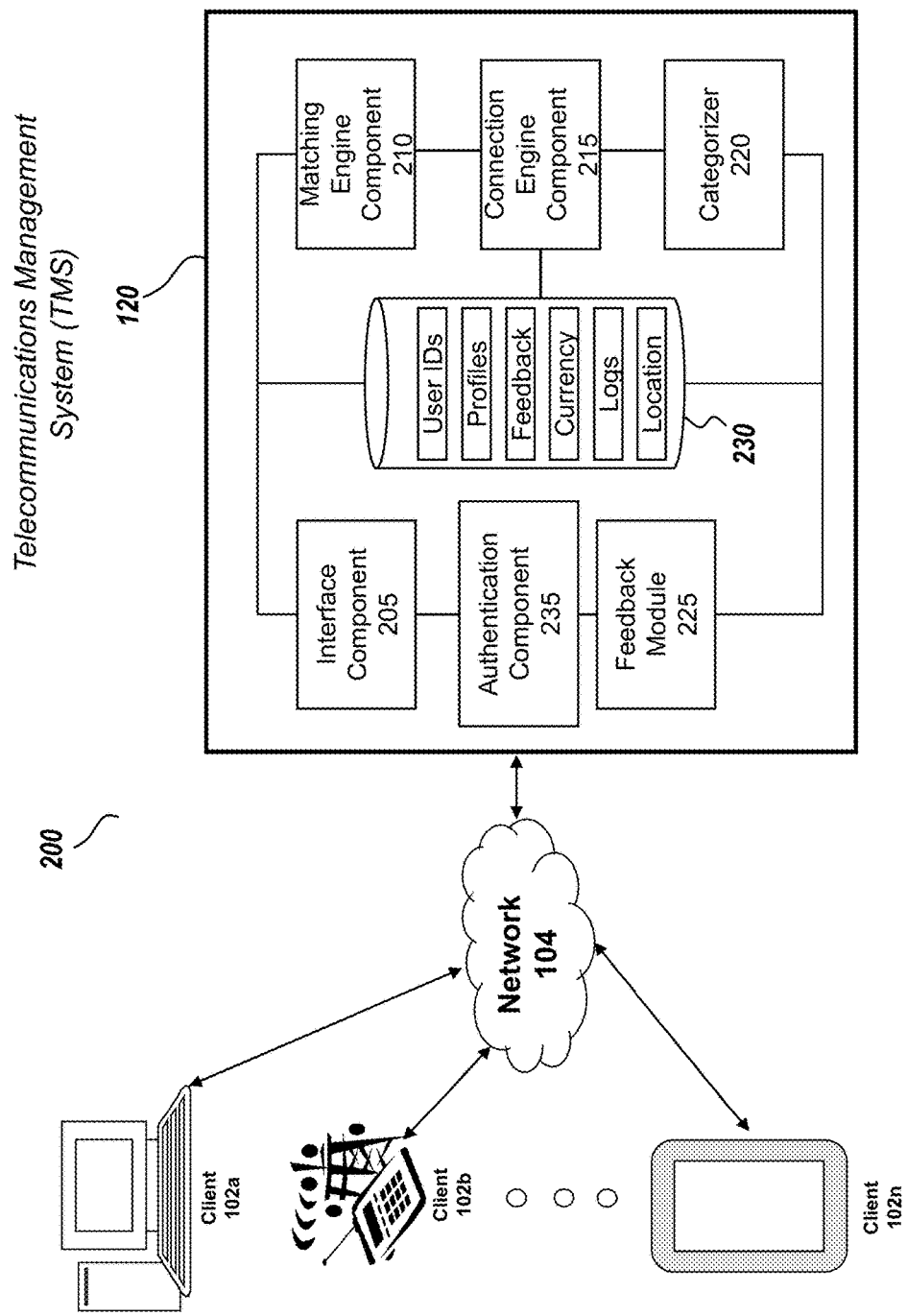
FIG. 2 is a block diagram depicting an embodiment of a system for managing telecommunications.

Referring now to FIG. 2, a block diagram depicting an embodiment of a system 200 for managing telecommunications is shown. In brief overview, and in some embodiments, the system 200 can include one or more clients 102a-n that communicate or interact with a TMS 120 via network 104. The clients 102a-n may include or refer to telecommunications devices 102. The TMS 120 can include or execute on one or more servers 106 or in a machine farm 38 or cloud 108. In some embodiments, the TMS 120 includes at least one interface component 205 configured to provide information between the TMS 120 and clients 102a-n and receive indications to initiate a telecommunications channel. The TMS 120 can include at least one matching engine component 210 that identifies characteristics of users of the TMS 120 or telecommunications device associates with users of the TMS 120. The matching engine component 210 can employ one or more matching technique or algorithm to identify match between two or more users in order to initiate telecommunications channel between the users. The TMS can include at least one authentication component 235 that can facilitate authenticating credentials associates with one or more clients 102a-n, devices 102a-n, or user thereof. The TMS can include at least one connection engine component 215 that can facilitate initiating a connection, or telecommunications channel, between two or more telecommunications devices 102a-n. The TMS 120 can include at least one categorizer 220 that can identify or generate categories for telecommunication channels or conversations. Categories may be based on topics, articles, tags, experts, or celebrities. The TMS 230 can include at least one feedback module 225 that identify or obtains indication of feedback and generates a rating or score for the user or the conversation based on the feedback. The TMS 120 can include a database 230 that stores, in one or more data structures in memory, information that facilitates managing telecommunications. The information can include, e.g., user identifiers (IDs), user profiles, feedback information (e.g., indications, scores, or ratings), currency, telecommunications logs, or location information.

The authentication component 235, interface component 205, matching engine component 210, connection engine component 215, categorizer 220, and feedback module 225 can each include at least one processing unit or other logic device such as a programmable logic array engine, or module configured to communicate with the database 230. The interface component 205, matching engine component 210, connection engine component 215, categorizer 220, and feedback module 225 can be separate components, a single component, or part of the TMS 120. The system 100 and its components, such as a TMS 120, may include hardware elements, such as one or more processors, logic devices, or circuits.

Still referring to FIG. 2, and in further detail, the TMS 120 can include an authentication component 235. The authentication component can be designed and constructed to authenticate a client device 102 responsive to receiving one or more credentials from the client device 102. Authentication credentials can include, for example, username, password, fingerprints, biometric authentication, facial recognition, voice recognition, token, key, security certificates, etc. For example, the authentication component 235 can retrieve a stored password or credential in database 230 for the device 102, and compare the stored password with a password or credential input for authentication to determine a match. If the TMS 120 determines a match, the TMS 120 can authenticate the device 120 for a predetermined duration or a length of a session (e.g., as long as the session is active, or until a time period of inactivity such as 1 to 15 minutes). The TMS 120 can then assign the device to a pool of devices that are authenticated, and select a device from the authenticated pool of devices to initiate an anonymous telecommunication channel.

The TMS 120 can include an interface component 205 designed and constructed to receive, access, obtain, transmit, convey or otherwise communicate with one or more component of the TMS 120 or device (e.g., matching engine component 210, connection engine component 215, categorizer 220, feedback module 225, or database 230) via network 104 other communication port. In some embodiments, the interface module 205 is configured to receive a request to initiate a conversation or telecommunications channel from a client 102a-n. The interface component 205 can receive a request from a first device to participate in an anonymous telecommunication. For example, a user of client device 102a may input a request to initiate a telecommunications channel into a user interface provided by the client device 102. The user interface may include, e.g., a touch interface, keyboard interface, voice recognition interface, figure gestures, a button, drop down menu, etc. The TMS 120 can store the request in database 230 for later processing. In some embodiments, the TMS 120 provides or otherwise conveys the request to the matching engine component 210, connection engine component 215, categorizer 220, or feedback module 225 for further processing. The interface module 205 can receive matching criteria information from client device 102 and store this information in the database 230 or otherwise transmit or convey the information to one or more component of the TMS 120 for further processing. The interface component 205 can be further designed and constructed to provide, generate, transmit, or otherwise present a graphical user interface via the client device 102.

In some embodiments, the TMS 120 includes a matching engine component 210 designed and constructed to identify a match between two or more users or devices 102. The matching engine component 210 can identify first one or more characteristics stored in a first configuration file (e.g., profile in database 230) for the first device. The matching engine component 210 can select from a pool of authenticated devices, a second device having second one or more characteristics stored in a second configuration file (e.g., profile in database 23) that matches the first one or more characteristics of the first device. In an illustrative example, the TMS 120 receives several requests to initiate conversations via telecommunication channels. The TMS 120 may further receive, prior to, along with, or subsequent to each request, information about each user or device 102 making the request, or a corresponding telecommunications device 102 associated with each request. In some cases, the TMS 120 may obtain the information from database 230 (e.g., user IDs, profile information, feedback information, location information). Responsive to the requests to initiate a conversation, the TMS 120 (e.g., via matching engine component 210) can compare characteristics of the users or corresponding telecommunications devices to identify a match. For example, the matching engine component 210 can evaluate the information to identify or generate one or more characteristics. The matching engine component 210 may compare the characteristics among the devices that made the request to initiate a conversation to identify a pair of users that are similar based on characteristics or values of the characteristics that match.

The following Table 1 illustrates example characteristics used by TMS to identify a match, in accordance with an embodiment. The values can include, e.g., numeric values, percentages, strings, characters, symbols, text, binary values, YES/NO fields, etc. The values may include ranges of values (e.g., an age range from 26-35).

TABLE 1

Illustrative Example of Characteristics used by TMS to Identify a Match

| Example Characteristic | Example Values | Example Weights |
|---|---|---|
| Interest Category | Sports (e.g., baseball, basketball, table tennis, disc golf, teams, players), entertainment, music genre (e.g., pop, classical, harmonious rap, folk), artists, games (e.g., poker, video games, role playing games), article, blog, post, social network post) | 10 |
| Demographics [age, gender, income, ethnicity, language, employment status, home ownership, location] | Age; age range; gender (e.g., male, female); income range (e.g., $50k-$100k) | 5 |
| Relationship Status | Married, single, interested in M/F | 4 |
| Available Network Interfaces | POTS, VoIP, WiFi, bandwidth amount, 3G, 4G, LTE, types of available hardware or software interfaces, communication ports | 1 |
| Location | Current location (e.g., based on Global Positioning System coordinates, latitude/longitude coordinates, town, city, county, state, geographic region, country, zip code, area code), check-in, home location, work location, recently visited locations | 2 |
| Browsing History | Topics associated with recently viewed online content, such as web pages, online documents, articles | 2 |

TABLE 1-continued

Illustrative Example of Characteristics used by TMS to Identify a Match

| Example Characteristic | Example Values | Example Weights |
|---|---|---|
| Applications | Applications or types of applications installed on telecommunications device; operating system | 1 |
| Rating/score | Rating may include a number of stars, a numeric score, a letter grade, colors, symbols or other indicates of a rating | 2 |
| Expert Status | Novice, Intermediate, Proficient, Expert (e.g., in relation to a topic, activity, skill, or profession); expert poker dealer; novice table tennis player; or other indicators of experience | 1 |
| Education | Education level (e.g., grade school, high school, college, graduate school, technical school, trade school); name of educational institution attended (e.g., name of grade school, name of high school, name of college, name of graduate school, name of technical school, name trade school) | 2 |
| Availability | Day of week or time of day user indicates availability to participate in telecommunications channels via TMS 120; day of week or time of day user historically makes requests to initiate telecommunications channels (e.g., Saturdays at 2 PM); available for the following time interval (e.g., available for the next 30 minutes, 1 hour, 2 hours or some other time interval) | 7 |
| Sensor | Accelerometer, temperature, barometer; modes based on sensor information (e.g., walking, driving, stationary) | 4 |

In some embodiments, the matching engine component 210 can determine a match based on a level of match. The matching engine component 210 may determine a level of match based on how many characteristics match between each user. The level of match may include, e.g., a percentage match, an absolute number, a numeric value, metric, letter grade, symbol, or other indicator of a level of match. For example, a pool of available users may include three users, and each user may have ten available characteristics. Further to this example, the matching engine component 210 may determine that a first user has seven characteristics in common with a second user; the first user has three characteristics in common with a third user; and the second user has five characteristics in common with the third user. Thus, the level of match between the first user and second user may be 70%; the level of match between the first user and the third user may be 30%; and the level of match between the second user and the third user may be 50%. In some embodiments, the matching engine component 210 may select a pair of users with the highest level of match. In this example, the TMS 120 may identify a match between the first user and the second user because they possess the highest level of match among the pool of available users.

The matching engine component 210 may use one or more techniques or algorithms to determine the match. In some embodiments, an administrator of the TMS 120 can configure the matching engine 120 with a matching technique or algorithm. For example, the matching engine component 210 can prioritize one or more characteristics when determining a match by assigning weights to certain characteristics or values. In some cases, the matching engine component 210 can determine that if a certain characteristic between a pair of users does not match (or does match), then the pair is prohibited from being matched. For example, if an age range for a first user does not match an age range of a second user, then the matching engine component 210 may determine that that first user and the second user do not match for the purposes of a telecommunications channel. Further to this example, the matching engine component 210 may determine that even if the first user and the second user have the highest relative level of match (e.g., 70% match), that the first user and the second are still not a match for the purposes of a telecommunications channel because of the age range mismatch. In some embodiments, this may refer to as a positive characteristic (e.g., a characteristic that needs to match in order to result in a match between a first user and a second user). In some embodiments, the matching engine component 210 can use a negative characteristic (e.g., a characteristic that, if it matches among the first user and the second user, blocks or prevents the matching engine component 210 from identifying a match between a first user and the second user).

In some embodiments, the matching engine component 210 can prioritizing characteristics by assigning weights to the characteristics. The weights may be assigned by an administrator of the TMS 120. The TMS 120 (or matching engine component 210) may receive the weights in a configuration file. The matching engine component 210 may periodically update the weights. Column 3 of Table 1 illustrates example weights that may be assigned to the characteristics. For example, the matching engine component 210 may identify a first data structure including characteristics for a first user as follows: Interest_Categotry.Sports{table_tennis, basketball}; Interest_Category.article{Blizzards in Boston}; Availability{Monday 2-4 PM}. The matching engine component 210 may also identify a second data structure including characteristics for a second user as follows: Interest_Categotry.Sports{table_tennis, baseball}; Interest_Category.article{Blizzards in Boston}; Availability{Monday 3:30-4 PM}.

The matching engine component 210 may perform a comparison between the characteristics of the first and second users to identify the following matches: Interest_Category.Sports{table_tennis}, Interest_Category.article{Blizzards in Boston}, and an overlapping match for Availability{Monday 3:30-4 PM}. The matching engine component 210 may apply a weight to each match and combine the weights to generate an overall match score: (10+10)+7=27. Thus, the matching engine component 210 may determine that the first user and the second user have a match score of 27. The matching engine component 210 may combine the weights via a summation, multiplication, or other combination technique or algorithm.

The matching engine component 210 may perform this comparison among multiple users to identify the pair of matching users with the highest matching score, or otherwise identify a pair of users that satisfy a matching criteria. In some cases, the matching engine component 210 may identify multiple pairs of users with a same matching score. In these cases, the matching engine component 210 may prioritize users based on a timestamp associated with the indication to initiate a telecommunications channel, or a rating of a user, geographic proximity, how frequently a user uses the TMS 120, or other factors. In some cases, the TMS 120 may randomly select a pair of users irrespective of one or more matching characteristics.

In some embodiments, the matching engine component 210 can use a machine learning algorithm or technique to automatically generate weights to apply to matching characteristics. The matching engine component 210 can be configured with one or more machine learning techniques including, e.g., computational statistics, probabilistic techniques, regression techniques, or data mining techniques. For example, the matching engine may generate a model based on data about historical telecommunications channels. The data may include, e.g., characteristics used to identify a match between users and feedback associated with the telecommunications channel. By using this model, the matching engine component 210 can adjust or modify the weights applied to matching characteristics in order to increase a weight or decrease a weight of a characteristic. For example, the TMS 120 may initiate a first telecommunications channel between a first user and a second user responsive to the interest category characteristic of the first user matching the interest category characteristic of the second user, even though the age range and expert status characteristics did not match. The TMS 120 may receive, upon termination of the telecommunications channel, low feedback from first user and the second user as to their experience during the telecommunications channel. In some cases, the TMS 120 may receive a statistically significant amount of feedback that is consistent. The TMS 120 may use this feedback to increase the weight applied to one or both of expert status and age range relative to the interest category. Thus, the TMS 120 may automatically determine, using or responsive to a machine learning technique or historical telecommunication data, to adjust or modify the weights for matching characteristics in order to optimize user experience (or feedback regarding indicative of user experience) during the telecommunications channel.

In some embodiments, the TMS 120 includes a connection engine component 215 designed and constructed to initiate a telecommunications channel between two or more telecommunication devices 102a-n. The TMS 120 can initiate the anonymous telecommunication channel between the first device and the second device responsive to selecting the second device. A telecommunications channel can include, e.g., an audio channel, video channel, analog channel, digital channel, a multimedia channel, a telephone call, plain old telephone service (POTS), or video call. The connection manager 210 may receive an identification of the two telecommunications devices 120a-n. For example, the matching engine component 210, responsive to identifying a match, may provide identifiers corresponding to the matching devices. The connections manager 215 may retrieve the identifiers of the matching devices from the database 230, or from the matching engine component 210.

The TMS 120 (or connection engine component 215) may utilize one or more techniques to initiate the telecommunication channel between two or more devices 102a-n. The connection engine component 215 can initiate an anonymous telecommunications channel such that the participants of the telecommunications channel do not obtain some or all identifying information of the other participants of the telecommunications channel. Identifying information may include, e.g., a user name, unique user identifier, phone number, device address, MAC address, IP address, electronic mail address, or other identifier that could identify the user. In some embodiments, the connection engine component 215 can generate a temporary identifier used to identify a user during the telecommunications channel. The TMS 120 may dynamically generate a temporary identifier upon request or upon initiation of the telecommunications channel. The TMS 120 may store, the database 230, an associate between the temporary identifier and the user's permanent identifier for further processing or further use. For example, a first user may want to contact a second user after the telecommunications channel has terminated. The first user may provide, to the TMS 120, an indication to contact the second user associated with the temporary identifier. The TMS 120 may then translate the temporary identifier to the permanent identifier to identify the second user, and then contact the second user on behalf of the first user. The second user may choose to ignore the request to connect with the first user, or may disable the temporary identifier such that temporary identifier can no longer be used to contact the second user. Thus, the second user can control whether or not the first user can contact the second user upon termination of the telecommunication channel. Further, the first user would be unable to identify the second user using the temporary identifier, since the temporary identifier was dynamically created for the telecommunications channel and may not be used again to identify the second user.

The connection engine component 215 may use one or more techniques to maintain anonymity between participants of a telecommunications channel. For example, the connection engine component 215 may disable caller ID features, may initiate a "blocked" call via POTS, hide identifying characteristics such as pictures, quotes, keywords, metadata, profile data, etc.

The connection engine component 215 can include or access a conference caller agent or engine that facilitates initiating and maintaining the telecommunications channel. For example, the connection engine component 215 may initiate a call to each participant of the telecommunications channel, and then combine the calls to generate the telecommunications channel. The connection engine component 215 may include a conference calling feature to facilitate combining or merging the calls to generate the telecommunications channel. The connection engine component 215 may maintain anonymity using this technique.

In some embodiments, the connection engine component 215 may instruct an agent running on a first device 102a to directly initiate a telecommunications channel with a second device 102b. The agent executing on the first device 102a may maintain anonymity of the first device and the second device by automatically initiating the telecommunications channel responsive to receiving the instructions from the TMS 120. For example, the first device 120 may receive an identifier of the second device in an encrypted format, initiate the call, and then erase the encrypted identifier.

The connection engine component 215 can select an optimal network interface for the telecommunications channel. The connection engine component 215 may identify available network interfaces for a first device 102a and a second device 102b that are participants of the telecommunications channel, and then select an optimal network interface for the channel. In some cases, the TMS 120 can select the same network interface for participants of the telecommunications channel, while in other cases the TMS 120 may select different network interfaces for participants of the telecommunications channel.

Available network interfaces may include, e.g., POTS, VoIP, Internet based telecommunications, satellite based telecommunications, radio frequency, short-wave radio, Bluetooth, WiFi, WiMax, or any other interface configured for network 104. The connection engine component 215 may select the interface based on various characteristics including, e.g., cost to use the communication mode (e.g., long distance fees), bandwidth, or quality of the channel (e.g., voice quality). The connection engine component 215 may select the interface that optimizes a metric based on these characteristics (e.g., fees, lowest bandwidth, quality, etc.). The connection engine component 215 may prioritize these factors. For example, the connection engine component 215 may determine that while POTS may provide the highest quality channel or connection, that it would be cheaper to use VoIP for this call. Thus, the connection engine component 215 may select VoIP. In some cases, the connection engine component 215 may determine that the difference in cost is negligible or within a threshold (e.g., $0.10; $0.05; $0.50; $1.00; or some other threshold set by an administrator of TMS 120 or by a user of the TMS 120 such as participants of the telecommunications channel). In some embodiments, a user may indicate, e.g., via a user profile, a cost threshold or preferences for network interfaces. The connection engine component 215 can apply weights to these factors to select a network interface. The connection engine component 215 may select a network interface based on user feedback (e.g., a survey presented to a user during or upon termination of a telecommunications channel.

The connection engine component 215 can configure one or more parameters of a telecommunications channel. For example, the connection engine component 215 can configure a timer with a duration parameter that causes the anonymous telecommunication channel to terminate upon expiration of the timer to reduce resource consumption. The timer can reset (or be resettable) to extend the anonymous telecommunication channel responsive to an event or trigger or instruction, such as receiving an indication from both the first device and the second device to maintain or extend the telecommunication channel. Resource consumption, such as network bandwidth, processor utilization, or battery drain on a mobile device can be reduced by automatically terminating the channel at a predetermined time. Thus, the TMS can have a default mode configured to terminate the channel, unless both devices provide an indication to continue with the channel. By cutting off the channel unless both devices want to continue, the TMS can avoid channels extending beyond a duration when a user of one of the devices is no longer interested in continuing, thereby reducing the resource consumption of the TMS as well as both devices.

The connection engine component 215 can configure the telecommunication channel with various parameters, such as duration of the telecommunications channel, number of participants, mode, or listen only mode (e.g., for one or more participants). For example, the TMS 120 may configure the telecommunications channel to have a predetermined duration, after which the telecommunications channel may either terminate or provide a prompt to the users to determine whether both users want to continue the channel. The duration may be predetermined by the TMS 120, or agreed on by participants of the channel. The duration may be, e.g., 3 minutes, 5 minutes, 10 minutes, 15 minutes, 20 minutes or some other duration set by the TMS 120 or users. Upon expiration of the duration or time interval, the TMS 120 may provide a prompt to one or more users or devices 102*a-n*. The prompt may include, e.g., a query regarding whether to continue the channel, continue the channel for a second predetermined duration (e.g., a duration that is the same, different, less than or greater than the initial predetermined duration), terminate the channel, exchange identifying information (e.g., the ability to contact the other user via TMS 120 or other means), record the contents of the channel (e.g., record the audio for quality purposes, to create a broadcast, a podcast, media item, etc.).

The connection engine component 215 may monitor the duration of the channel using a timer or counter and, responsive to expiration of the timer or the duration matching a predetermined duration, automatically terminate the call, generate a prompt, or take some other predetermined action with respect to the channel.

For example, the connection engine component 215 can provide a selectable prompt for display on both the first device and the second device of the anonymous telecommunication channel. The connection engine component 215 can receive a first indication from the first device to extend the anonymous telecommunication channel, and receive a second indication from the second device to terminate the anonymous telecommunication channel. Since both devices did not want to continue the telecommunication, the connection engine component 215 can determine to terminate the anonymous telecommunication channel. The indication to terminate can include the absence of an indication to continue the call, or lack of user input into the device.

When a device from the pool of authenticated device is selected for a telecommunication channel, the TMS 120 can remove the selected device from the pool, such as responsive to initiating the anonymous telecommunication channel between the first device and the second device. In some cases, the TMS 120 can maintain or assign the device to multiple pools. For example, each pool can correspond to a different category. Thus, the TMS 120 may remove the selected device from the pool corresponding to the initiated telecommunications channel, while maintaining the device in the other pools. While the select device is participating in a first telecommunication channel, the TMS 120 may determine that a third device matches the selected device and identify this as an opportunity to initiate another telecommunication channel. The TMS 120 can, responsive to this identification, provide a prompt to the second device requested instructions on whether to terminate the current telecommunication channel, and initiate a new telecommunication channel with the third device selected based on a characteristic or category of the second pool.

For example, the TMS 120 can add the second device to a second pool of authenticated devices. The TMS 120 can remove the second device from a first pool of authenticated devices responsive to initiating the anonymous telecommunication channel between the first device and the second device. The TMS 120 can maintain the second device in the second pool of authenticated devices during the anonymous telecommunication channel. The TMS 120 can provide, during the anonymous telecommunication channel, a selectable prompt to the second device to initiate a second anonymous telecommunication channel with a third device of the second pool of authenticated devices. The TMS 120 can terminate, responsive to receiving a selection via the selectable prompt, the anonymous telecommunication channel between the first device and the second device to initiate the second anonymous telecommunication channel between the second device and the third device.

TMS 120 can include a categorizer 220 designed and constructed to identify or generate categories for telecommunications channel. The categories can be based on topics, semantic concepts, articles, blogs, social network posts, subject matter, expert status, etc. The categorizer 220 can dynamically generate categories, or users of the TMS 120 can provide indications of categories. For example, a web site publisher may provide an indication to the TMS 120 to create a category for content or subject matter of a web site published by the web site publisher.

The categorizer 220 can identify categories using one or more techniques. The categorizer 220 can identify trending topics using a social network platform, search engine history, third party databases or tools, or topic popularity. For example, the categorizer 220 can identify a category based on a number of searches for a topic input into a search engine during a period of time (e.g., the last 6 hours; 12 hours; 24 hours; 48 hours or some other time interval indicative of a trending topic); the number of posts in a social network platform during the period of time; number of web sites or online documents published about a topic during the period of time, etc. To identify the topics, the categorizer 220 may include, be configured with, employ or otherwise use web crawlers, Internet bot, automatic indexer, or other tool that parses online documents to categorize or identify a trending topic.

In some embodiments, the categorizer 220 may identify a category based on an embedded tag in an online document. The tag can be embedded in various types of content including, e.g., online web sites or web pages, multimedia content, articles, blogs, social network posts, RSS feeds, streaming media, etc. The tag can include a predetermined combination of one or more of characters, strings, symbols, text, numbers, formatting, etc. The tag can identify a name of a category. For example, a web site may identify a category using a tag as follows: "<tag><category_name>". The tag may be embedded in a web site such that some or all of the tag is hidden from view. For example, the tag may be embedded in HTML using an HTML <div> tag that prevents a web browser from rending the tag on the web site. Thus, when the web site is rendered for display, a viewer of the web site may not see the embedded category tag, but the categorizer 220 may nevertheless identify the tag as it parses the HTML code of the web site.

In some embodiments, a user of the TMS 120 may create a category by inputting a category name via an interface component 205 of the TMS 120 or an interface of a client device 102. In some embodiments, the TMS 120 may provide a category suggestion to the user (e.g., based on trending topics or categories that may be relevant to the user based on historical user data such as characteristics of the user, historical telecommunications channels, user feedback, user profile, etc.). The TMS 120 may provide the suggestions via a drop down menu, pop up window, text, images, etc.

The TMS 120 can include a feedback module 225 designed and constructed to obtain feedback from participants of a telecommunications channel and analyze or process the feedback to generate or update a rating or score for the participant. The feedback module 225 can update, upon termination of the anonymous telecommunication channel, the profiles or configuration files in database 230 with the feedback. For example, the feedback module 225 can update the first configuration file for the first device and the second configuration file of the second device to tune the matching engine component 210. Tuning the matching engine component 210 can, for example, include providing the matching engine component 210 with new, updated, or revised information about the devices 102 that the matching engine component 210 can use to select matching devices for a telecommunication channel. Tuning the matching engine component 210 can reduce resource consumption by allowing the TMS to more efficiently match devices or identify a better match that can allow for a higher quality telecommunication channel or user experience. The matching engine component tuned to identify improved matches can cause longer duration telecommunication channels, which can reduce the number of matching selection processes the matching engine component might perform in a given time period. By reducing the number matching processes, the TMS can reduce processor and memory utilization, as well as bandwidth utilization from device requests. Thus, the tune matching engine can improve the functioning of the TMS itself.

The feedback module 225 may obtain indications of feedback or user experience in various ways including, e.g., a selectable prompt or survey. For example, the feedback module 225 may monitor a duration of the telecommunications channel to determine user experience (e.g., a longer phone call may indicate that the participants enjoyed the phone call and were a good match, while a shorter phone call may indicate that they were not a good match). The feedback module 225 may provide a survey, questionnaire or other queries to participants to solicit feedback regarding the telecommunications channel. The survey may include questions directed to an expert level in a topic/category, professionalism, responsiveness, personality (good, mild, shy, open), would you talk to this person again, etc.

The feedback module 225 can receive the feedback in the form of numeric values, a scale (e.g., a scale from 1 to 10, where 1 is most negative feedback and 10 is highest feedback or vice versa), written feedback, comments, drop down menu with predetermined feedback options, buttons, etc. The feedback module 225 can process or analyze the feedback to generate a rating or score based on the channel, or update a previous rating or score of the user. The feedback module 225 can dynamically tailor feedback or inquiries about feedback based on a category. The feedback module 225 may further generate a score or rating for a user based on a category of the telecommunications channel. For example, if the channel was related to a category such as dealing poker, the feedback module 225 may generate a survey inquiring about a level of knowledge of dealing poker. For example, the feedback module 225 may ask the first user whether the first user believed that the second user was an expert at dealing poker, intermediate, or novice. The TMS 120 may receive, from the second user, an indication as to a level of knowledge of the second user. The TMS 120 may use this information to update or generate a rating for the second user (e.g., if first user identified the second user as an expert, the TMS 120 may assign expert status to the second user for the category of dealing poker). However, the second user may receive a rating of novice for when participating in a telecommunications channels for a politics category.

Thus, the system can address the technical problems and challenges of implementing the functionality of authenticating devices, matching a devices, initiating a channel, configuring the channel with a timer to reduce resource consumption, and tuning the matching engine responsive to termination of the channel. For example, resource consumption such as processor utilization and network bandwidth can be reduced by terminating the calls based on a predetermined duration. Furthermore, a greater number of channels for a device can be initiated in a given time by reducing a duration of each channel. By initiating more channels for a device, the device may be more likely to identify an optimal channel.

Figure 3:
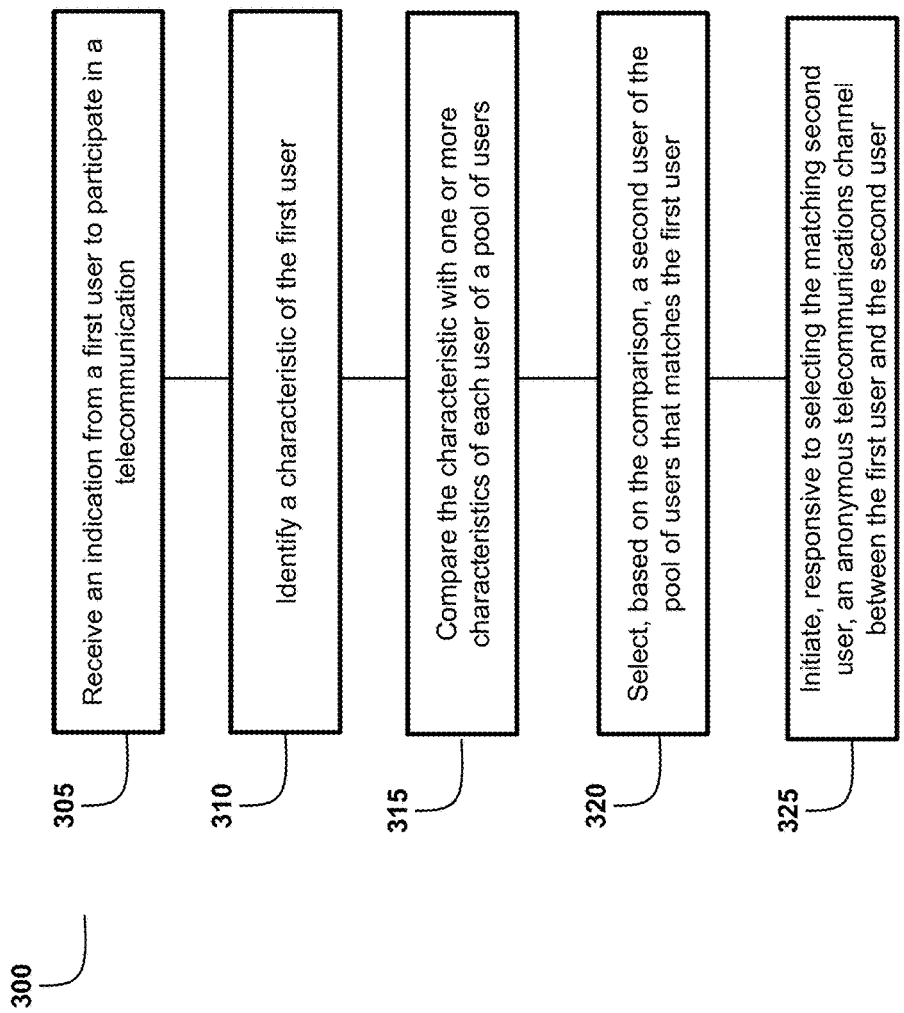
FIGS. 3-7 are flow diagrams depicting embodiments of methods of managing telecommunications.

Referring now to FIG. 3, a flow diagram depicting a method 300 of managing telecommunications is shown. The method 300 can be performed by one or more component or system illustrated in FIGS. 1A-12. For example, the TMS 120 can perform one or more function or process of method 400. In brief overview, the method 400 includes the TMS 120 receiving an indication from a first user to participate in a telecommunication at block 305. At block 310, the TMS identifies a characteristic of the first user. At block 315, the TMS compares the characteristic of the first user with one or more characteristics of each user of a pool of users. At block 320, the TMS selects, based on the comparison, a second user of the pool of users that matches the first user. At block 325, the TMS initiates, responsive to selecting the matching second user, an anonymous telecommunications channel between the first user and the second user.

Still referring to FIG. 3, and in further detail, the TMS 120 (e.g., via an interface) receives an indication from a first user to participate in a telecommunication at block 305. The TMS can receive the indication from a user device such as a telecommunications device. The TMS can receive the indication via a network. The TMS can receive the indication via a user interface, such as a graphical user interface, that includes buttons, widgets, or input text boxes. The TMS can receive or obtain additional information to facilitate initiating a telecommunications channel for the user. The TMS can receive, e.g., location information of the user device that provided the indication (e.g., via a GPS sensor of the user device). The indication may further indicate a time interval for the telecommunications channel. For example, the indication may indicate when the user is available to participate in a telecommunication channel (e.g., time of day, day, time from now such as in 30 minutes, or available for the next 1 hour).

In some embodiments, the TMS may receive the indication responsive to a geo-fence. For example, a user of a smartphone or other computing device may establish a geo-fence around a geographic boundary. A geo-fence or geo-fencing is a location-based technology that allows the TMS or other device to set up a virtual boundary or fence around a real-world geographic location. The TMS may be configured to initiate a telecommunications channel responsive to a user device triggering a geo-fence. The TMS may be further configured with additional information, such as a category of interest, duration of the telecommunications channel, etc. For example, a user may establish a geo-fence around their work location or home location such that when they leave the location to begin their commute, the TMS automatically determines that the they have triggered the geo-fence and initiates a telecommunications channel. The TMS may configure the telecommunications channel with parameters such as a duration (e.g., based on the user's typical commute), a preferred category (e.g., based on historically preferred categories, feedback).

At block 310, the TMS (e.g., via a matching engine) identifies a characteristic of the first user. The characteristic may identified or determined from a user profile stored in a database. The characteristic may refer to a characteristic illustrated in Table 1. In some embodiments, the TMS may prompt the user to input a characteristic responsive to receiving the indication to initiate the telecommunications channel. In some embodiments, the user inputs one or more characteristic when providing the indication (e.g., TMS receives characteristics along with indication to initiate channel). In some embodiments, the TMS parses historical data associated with the user to identify a characteristic (e.g., data stored in database such as logs associated with previous telecommunications channels, feedback information, etc.). In some embodiments, the TMS identifies a characteristics based on sensor data from the user device providing the indication to indication the channel. For example, sensor data may include GPS coordinate information, accelerometer information, temperature information, barometer information. The TMS may determine, based on accelerometer information, that a user is driving.

At block 315, the TMS (e.g., via a matching engine) compares the characteristic of the first user with one or more characteristics of each user of a pool of users. The TMS may perform a comparison based on values of characteristics. The TMS may compare characteristics with some or all users in a pool. For example, the TMS may filter the users in the pool and perform a comparison with a subset of users in the pool. The TMS may filter the users in the pool based on a characteristic, such as available network interface (or fees associated with a channel based on the available network interface satisfying a threshold). The filter parameters may be provided by a user, such as via a user profile stored in a database. For example, the user may indicate that they do not want to participate in telecommunications channels with a second user having a certain characteristic (e.g., age range, gender, from a certain geographic location, etc.). In some embodiments, the filter parameters may be established via parental controls for the user account.

At block 320, the TMS (e.g., via a matching engine) selects, based on the comparison, a second user of the pool of users that matches the first user. The TMS can identify a match based on the characteristics being the same, overlapping, or substantially similar. Substantially similar may refer to cases where the characteristics are semantically similar, but do not user the exact same phrase or text. For example, the terms ping pong and table tennis may be semantically similar, while they are not the same terms. The TMS may employ a probabilistic semantic analysis engine to identify semantic similarity. The TMS may identify similarity based on synonyms of terms or phrases. In some cases, a match may refer to overlapping match (e.g., available from 2-4 PM would match available from 3-3:30 PM). In another example, the TMS may determine a match between characteristic "interested in video games" and characteristic "interest in computer games". In some embodiments, the TMS may assign weights based on a level match (e.g., exact match, semantic match, overlapping match). The TMS may assign a same or different weight based on the type of match. For example, the TMS may assign a higher weight to an exact match as compared to a semantic match. The TMS may assign a higher weight to a semantic match as compared to an overlapping match. In some cases, the TMS may adjust weights based on feedback or other information.

The TMS can identify a second user that matches the first user based on the comparison of characteristics between the two users, scoring, or weighting. When identifying a matching user, the TMS may use some or all available characteristics. For example, if the first user chooses to initiate a telecommunications channel for a certain category, the TMS may prioritize the matching characteristics for the category over other characteristics such as demographics or location.

At block 325, the TMS (e.g., via a connection manager) initiates, responsive to selecting or identify the matching second user, an anonymous telecommunications channel between the first user and the second user. The TMS may initiate the telecommunications channel by establishing a first connection (or first telecommunication link) with a first device of the first user and a second connection (or second telecommunication link) with a second device of the second user. The TMS may merge or bridge the first connection and the second connection to establish the anonymous telecommunications channel.

In some embodiments, the TMS may instruct the first device to establish a connection with the second device. For example, the TMS may instruct an agent executing on the first device to establish a connection with the second device. The agent on the first device can establish the connection in an anonymous manner with the second device. For example, the first device may establish a VoIP or other Internet based connection using a temporary identifier. The TMS may dynamically generate the temporary identifier for the purpose of the telecommunications channel.

In some embodiments, the TMS can instruct an agent executing on the first device to communicate with an intermediary device different from the second device. The intermediary device can include the TMS, a phone service provider or some other entity. The TMS can provide the intermediary device with routing instructions (e.g., an identifier or phone number of the first device or second device) to route communication to the second device. The intermediary device can route communications from the first device to the second device to establish the anonymous telecommunication channel. The intermediary device can also route communications from the second device back to the first device.

Figure 4:
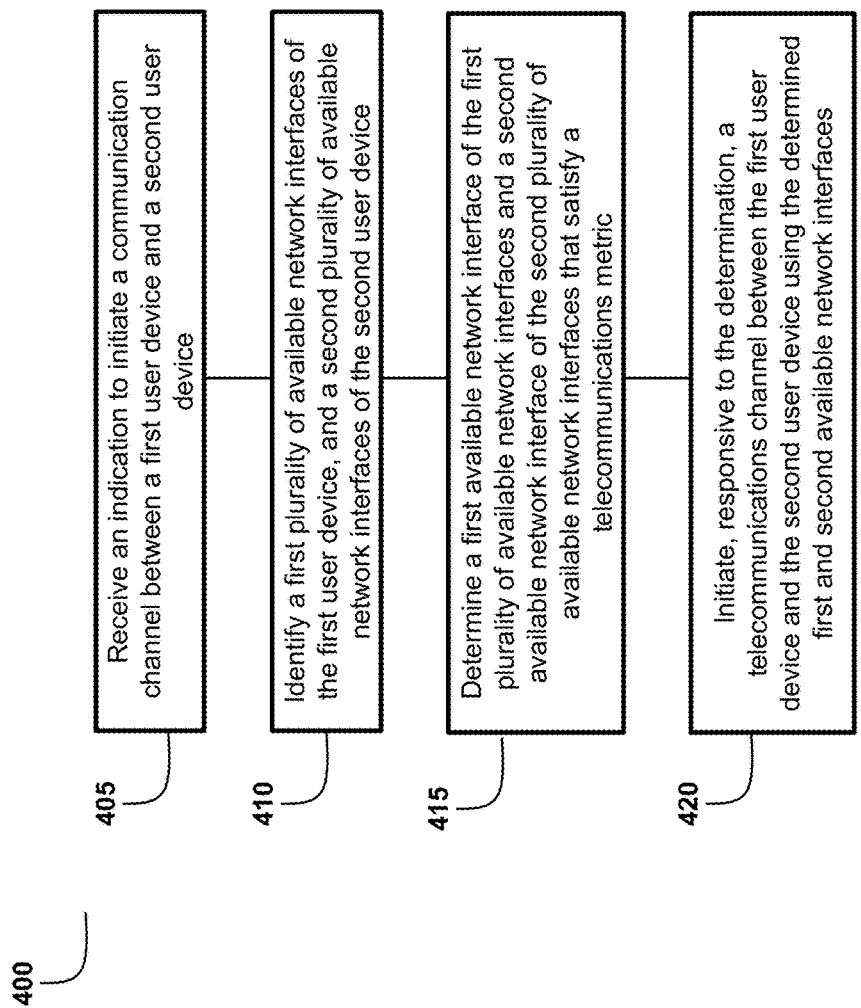

Referring now to FIG. 4, a flow diagram depicting a method 400 of managing telecommunications is shown. The method 400 can be performed by one or more component or system illustrated in FIGS. 1-3. For example, the TMS 120 can perform one or more function or process of method 400. In brief overview, the TMS receives an indication to initiate a communication channel between a first user device and a second user device at block 405. At block 410, the TMS identifies a first plurality of available network interfaces of the first user device, and a second plurality of available network interfaces of the second user device. At block 415, the TMS determines, using a heuristic technique, a first available network interface of the first plurality of available network interfaces and a second available network interface of the second plurality of available network interfaces that satisfy a telecommunications metric. At block 420 the TMS initiates, responsive to the determination, a telecommunications channel between the first user device and the second user device using the determined first and second available network interfaces.

Still referring to FIG. 4, and in further detail, the TMS receives an indication to initiate a communication channel between a first user device and a second user device at block 405. For example, the TMS may match the first and second user devices and determine to initiate a communication channel between the first and second user devices.

At block 410, the TMS identifies a first plurality of available network interfaces of the first user device, and a second plurality of available network interfaces of the second user device. The network interfaces may include, e.g., a POTS interface, VoIP interface, types of VoIP interfaces, a cellular interface (e.g., 2G, 3G, 4G, LTE) a WiFi interface, Bluetooth interface, radio frequency interface, short-wave radio interface, etc. One or more interfaces may be associated with a fee or cost for usage. For example, a POTS interface may incur long distance fees, whereas an Internet based audio interface may not incur fees, or incur reduced fees. Further, the TMS may identify a metric associated with each interface. The metric may include, e.g., cost, quality, ease of configurations, or number of simultaneous participants. The TMS may retrieve, from a database information about the metrics for the available network interfaces. In some cases, the TMS may poll a third party database for information about metrics. For example, a third party provider of the communication interface (e.g., a phone provider or VoIP provider).

At block 415, the TMS determines a first available network interface of the first plurality of available network interfaces and a second available network interface of the second plurality of available network interfaces that satisfy the telecommunications metric. The TMS may evaluate parameters associated with the telecommunications channel or devices to determine whether the network interface satisfies the metric. For example, the TMS may identifies locations of the user devices to determine that the call would be a long distance call, and choose to select a network interface that minimizes the cost of the call. In another example, the TMS may determine that there is low bandwidth between one of the first and second devices, and thus choose a non-Internet based network interface (e.g., POTS).

At block 420 the TMS initiates, responsive to the determination, a telecommunications channel between the first user device and the second user device using the determined first and second available network interfaces. The TMS may select the same network interface for both devices, or may select different interfaces that are optimized for each device.

Figure 5:
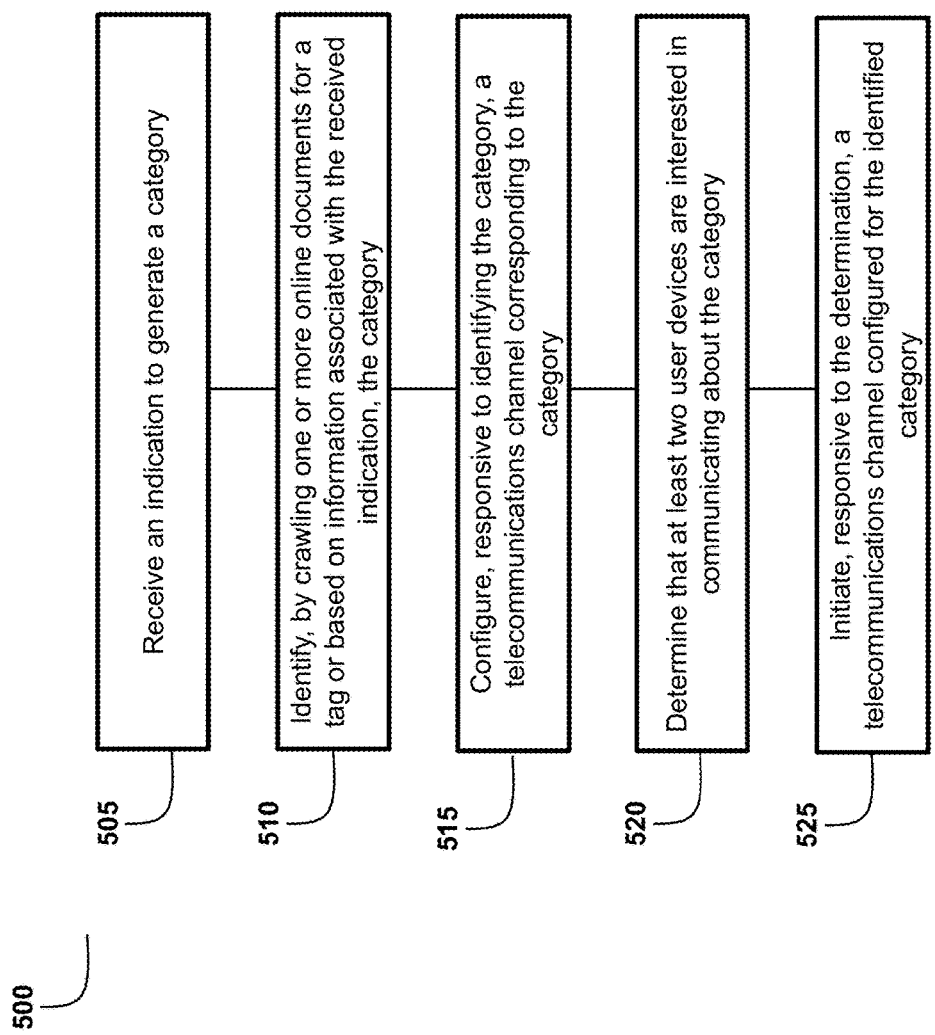

Referring now to FIG. 5, a flow diagram depicting a method of managing telecommunications is shown. The method 500 can be performed by one or more component or system illustrated in FIGS. 1-3. For example, the TMS 120 can perform one or more function or process of method 500. In brief overview, the TMS can receive an indication to generate a category at block 505. At block 510, the TMS identifies, by crawling one or more online documents for a tag or based on information associated with the received indication, the category. At block 515, the TMS configures, responsive to identifying the category, a telecommunications channel corresponding to the category. At block 520, the TMS determines that at least two user devices are interested in communicating about the category. At block 520, the TMS initiates, responsive to the determination, a telecommunications channel configured for the identified category.

Still referring to FIG. 5, and in further detail, the TMS receives an indication to generate a category at block 505. The TMS may receive the indication via an interface of the TMS. For example, a client device may provide or transmit the indication via a network to an interface of the TMS. The TMS may generate a graphical user interface including buttons, input text boxes, etc. configured to receive an identification. In some embodiments, the TMS can be configured to poll, ping, parse, or otherwise access a resource (e.g., online document, web page, database, or application) based on a time interval (e.g., periodically, every hour, 6 hours, 12 hours, 24 hours, weekly, monthly, etc.) or responsive to a condition or trigger event. For example, the TMS may access a web page responsive to content on the web page being updated (e.g., a new article published on the web page). In some cases, a web site publisher may provide an indication to the TMS that content of the web page has been updated or changed, which may serve as an indication to the TMS to generate a new category.

The indication may include additional information about the category to create. The information may include a name of the category (e.g., characters, strings, numbers, symbols). In some embodiments, the category may include a hierarchical tree structure (e.g., sports/baseball/American League/Red Sox). In some embodiments, the indication may include a uniform resource locator (URL) to a resource or online category comprising information about the category.

At block 510, the TMS identifies a tag or based on information associated with the received indication. The TMS may crawl one or more online documents for tag. The tag may facilitate identifying the category. The TMS may crawl the online document responsive to receiving the indication to generate a category. The tag may facilitate indicating or identifying the category. In some embodiments, the tag may be embedded in an online document or application, such as an HTML <div> tag. In some embodiments, the tag may be input by a user into a text box and rendered on an online document. For example, a user may input the tag (which can include a combination of one or more of predetermined text, characters, symbols, numbers). The tag may be rendered on a web page or otherwise embedded or provided on a web page such that the TMS, when parsing or crawling the web page, can identify the tag. The tag may be combined with information about a category. For example, a user may input the predetermined tag in combination with information about a category such as a category name. The predetermined tag may be preceded by, followed by, or encapsulate the category information.

At block 515, the TMS configures, responsive to identifying the category, a telecommunications channel corresponding to the category. The telecommunications channel may restrict participants based on the category. For example, the TMS may initiate the telecommunications channel with users having a characteristic that matches the category of the telecommunications channel. In some embodiments, the category may be configured with criteria or requirement. The TMS (e.g., via an authentication component) may use the criteria or requirements to authorize or permit users or devices to participate in the telecommunications channel or assign devices to a pool of authenticated devices. Criteria may include or be based on one or more characteristic identified in Table 1 (e.g., a minimum age requirement). In some embodiments, configuring one or more telecommunications channels for one or more categories may include or refer to generating a list of categories. The TMS may store the list in a database. The TMS may display the list or otherwise provide the list for display on a client device (e.g., via a network). In some embodiments, the category information may include a minimum or maximum number of participants in a telecommunications channel of the category. In some embodiments, the category information may include a maximum number of active telecommunications channel for a category (e.g., active may refer to users actively participating in a channel by having a conversation using or via the telecommunications channel).

At block 520, the TMS determines that at least two user devices are interested in communicating about the category. In some embodiments, the TMS displays the available category via a graphical user interface, and then receives an indication or selection from one or more users that are interested in the category. The TMS can receive the selection via the network and store the selection. In some embodiments, the TMS compares characteristics associated with users and the category to identify a match between the use and the category. At block 520, the TMS initiates, responsive to the determination, a telecommunications channel configured for the identified category.

Figure 6:
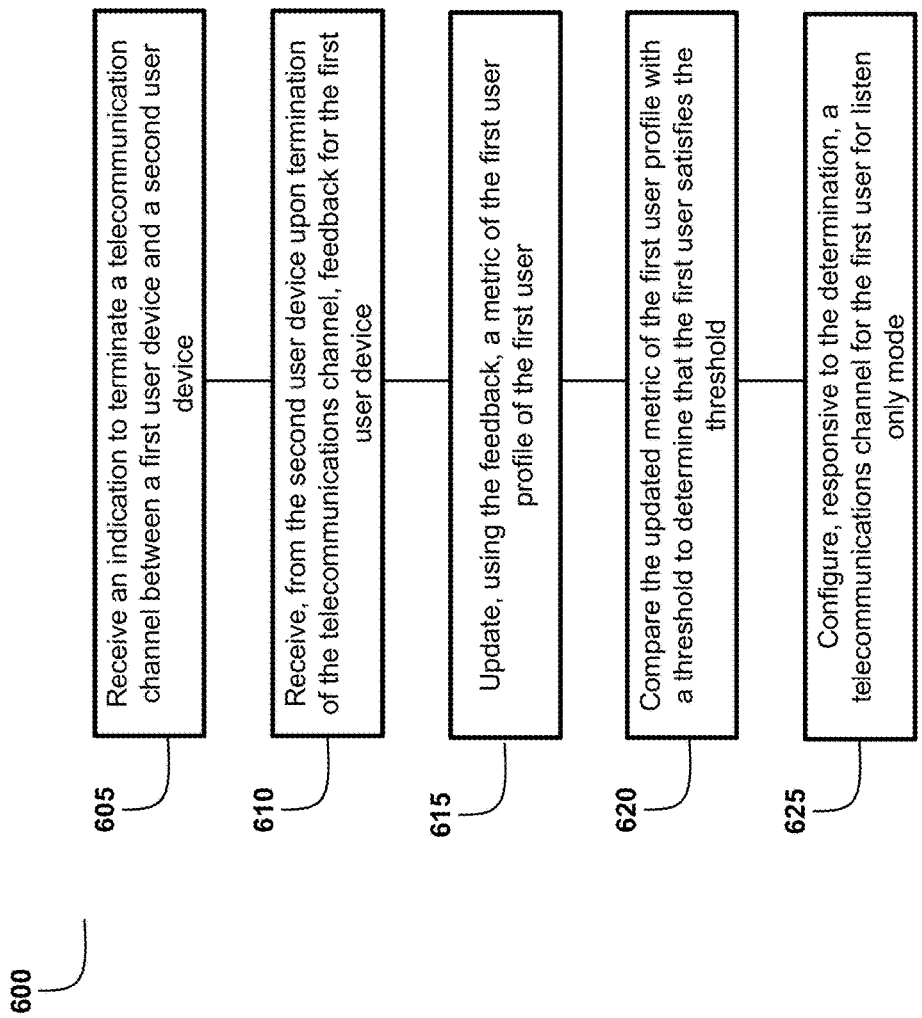

Referring now to FIG. 6, a flow diagram depicting a method 600 of managing telecommunications is shown. The method 600 can be performed by one or more component or system illustrated in FIGS. 1-3. For example, the TMS 120 can perform one or more function or process of method 600. In brief overview, the TMS receives an indication to terminate a telecommunication channel between a first user device and a second user device at block 605. At block 610, the TMS receives, from the second user device upon termination of the telecommunications channel, feedback for the first user device. At block 615, the TMS update, using the feedback, a metric of the first user profile of the first user. At block 620, the TMS compares the updated metric of the first user profile with a threshold to determine that the first user satisfies the threshold. At block 625, the TMS configures, responsive to the determination, a telecommunications channel for the first user for listen only mode.

Still referring to FIG. 6, and in further detail, the TMS receives an indication to terminate a telecommunication channel between a first user device and a second user device at block 605. The indication may include one or more users of the channel hanging up their phone, selecting a button to terminate or end the channel, a timer for the channel expiring, or an audio command made during the channel.

At block 610, the TMS receives, from the second user device upon termination of the telecommunications channel, feedback for the first user device. The TMS may identify indications of feedback based on, e.g., a channel duration, channel volume level, number of pauses during a channel, number of words spoken during a channel, ratio of communication between users of the channel (e.g., a first user spoke 3 times as much as compared to a second user). To measure ratio of communication or number of words, the TMS may transcribe the conversation from voice to text using a transcription engine and then count the words. The TMS may allocate the words to the first and second user devices, respectively. For example, the TMS may use voice recognition techniques to identify which user is speaking and associate the transcribed words accordingly. In some embodiments, the TMS can receive feedback from the users via a survey, questionnaire, buttons, rating, written comments, or a binary indication (e.g., like or dislike).

At block 615, the TMS updates, using the feedback, a metric of the first user profile of the first user. The metric may include a score or rating for the user. The score may be a numeric score on a scale. The score may be computed or determined using the feedback or other factors. Other factors may include a number of conversations the user has conducted using the TMS, an average duration of conversations, a number of repeat or follow up conversations (e.g., when two users that were automatically matched by the TMS choose to have a follow-up conversation via the TMS). In some embodiments, the TMS may use the rating or score to rank all TMS users. Thus, the TMS may re-compute or update a user's score responsive to the user participating in a telecommunications channel.

At block 620, the TMS compares the updated metric of the first user profile with a threshold to determine that the first user satisfies the threshold. The threshold may be a relative threshold or an absolute threshold. For example, the threshold may be based on a ranking or percentile of the user in the TMS (e.g., a rank based on scores, where the threshold refers to a top N rank such as a top 10, top 100, top 20, top 500 or other threshold). In another example, the threshold may be based on an absolute score (e.g., 50, 75, etc.). An administrator of the TMS may set the threshold using a configuration file that can be stored in the database. The threshold may be specific to a category or category dependent. The TMS may automatically adjust the threshold using feedback and machine learning techniques.

At block 625, the TMS configures, responsive to the determination, a telecommunications channel for the first user for listen only mode. Listen only mode may refer to blocking input audio from one or more participants of a telecommunications channel, while providing output to the one or more participants. For example, a telecommunications channel may include 50 participants. Two of the 50 participants may be engaged in a two-way conversation where audio input from a first and second telecommunications devices of the first and second users is conveyed to all the other telecommunications devices participating in the channel. The telecommunications devices of the remaining 48 users may receive audio output from the first and second telecommunications devices. However, the TMS may prevent audio input from the remaining 48 user from being broadcast, shared, or otherwise conveyed in the telecommunications devices. To do this, the TMS may configure an agent or component on the telecommunications devices to mute the device or otherwise disable an audio input port or sensor. In some embodiments, the TMS may receive the audio input and filter it such that it is not merged into the telecommunications channel.

The TMS may configure the channel for listen only mode for the first use because the TMS may determine that the first user is an expert in a topic or otherwise has a high score or ranking. For example, the first user may be a celebrity (e.g., famous movie star, comedian, athlete, musician, politician, businessman, entrepreneur, chief executive officer, or otherwise possess notoriety). The TMS may determine the notoriety of the user based on feedback. The TMS may establish a channel whereby other users can listen to a conversation being conducted by the first user. In some embodiments, the TMS can generate a category corresponding to the first user such that users can select the category and listen or participate in the channel.

In some embodiments, the TMS can establish a queue (or pool of authenticated devices or users) for a telecommunications channel for a category. For example, a first user and a second user may participate in a conversation via a telecommunications channel for a category. A third user may indicate to the TMS an interest in participating in a conversation for the category with the first user (e.g., the first use may be a celebrity or an expert). The TMS may place the third user in a queue for the channel with the first user. When the second users leaves the channel, the TMS may automatically enter the third user (or the first user in the queue) into the channel with the first user.

In another example, the queue may include two or more users. In this example, the TMS may initiate a side channel with the first and second members of the queue while the channel with the first and second users is active. When the second user leaves the main channel with the celebrity first user, the TMS may terminate the side channel and enter the first user in the queue into the main channel with the celebrity first user. If the queue includes additional users, the TMS may automatically initiate a second side channel with the second member of the queue and a third member of the queue. Thus, users of the TMS can choose to initiate side channels while waiting to speak with a celebrity or expert, or may choose to enter a listen only mode with the celebrity.

In some embodiments, devices can be added or removed from one or more queues as devices are selected or join one or more telecommunications channels. For example, if a device in a queue or pool for a telecommunication channel for a category, and then joins that telecommunication channel, the TMS can remove the device from the queue or pool. If the device is multiple queues or pools, the TMS can maintain the device in the other pools while removing the device from the pool corresponding to the telecommunication channel the device joined. Thus, if the device is later selected for another telecommunication channel corresponding to a category of another pool, the TMS can provide a selectable prompt to the device while the device is participating in the first telecommunication channel. The TMS can receive, in response to the prompt, an indication to join the new telecommunication channel. The TMS can then terminate, responsive to receiving the selection via the selectable prompt, the first anonymous telecommunication channel between the first device and the second device to initiate the second anonymous telecommunication channel between the second device and the third device.

Figure 7:
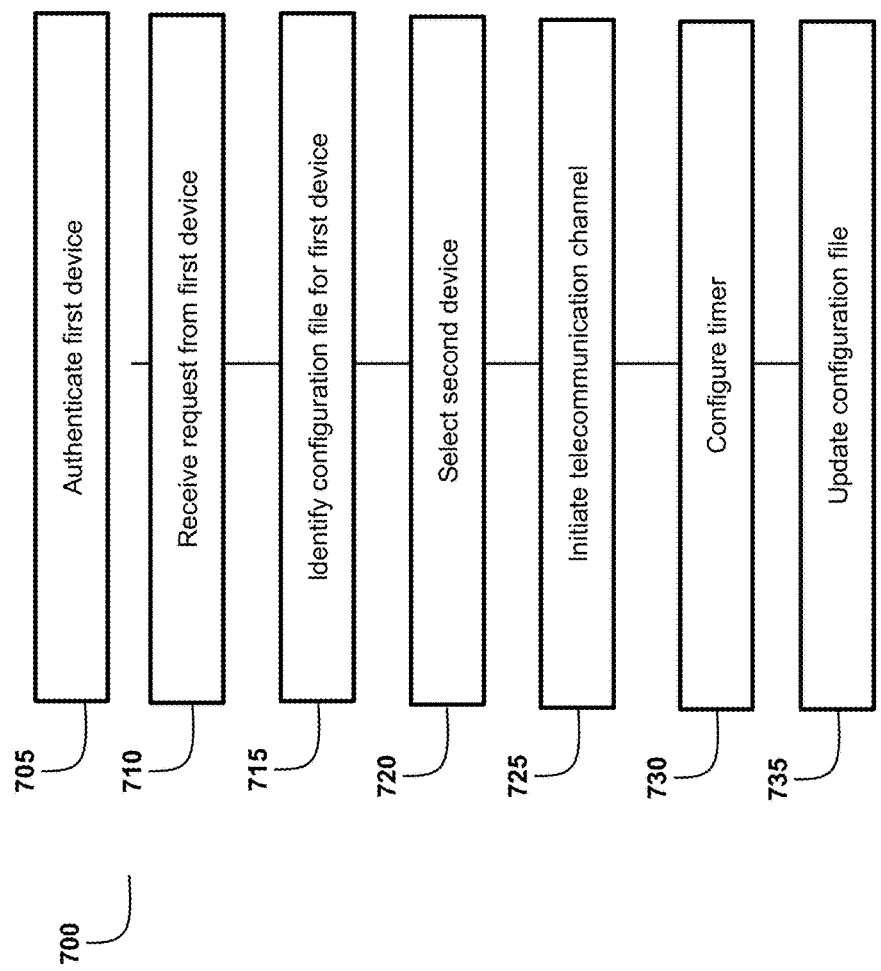

Referring now to FIG. 7, a flow diagram depicting a method 700 of managing telecommunications is shown. The method 700 can be performed by one or more component or system illustrated in FIGS. 1-3. For example, the TMS 120 can perform one or more function or process of method 700. In brief overview, the TMS can authenticate a first device at 705. At 710, the TMS can receive a request from the first device. At 715, the TMS can identify a configuration file for the first device. At 720, the TMS can select a second device. At 725, the TMS can initiate a telecommunication channel. At 730, the TMS can configure a timer. At 735, the TMS can update the configuration file.

Still referring to FIG. 7, and in further detail, the TMS can authenticate a first device at 705. For example, an authentication component of the TMS can authenticate a first device responsive to receiving one or more credentials from the first device. The credentials can include, e.g., a password or other security token. The TMS can authenticate the device responsive to the user launching an application that triggers a handshaking or authentication protocol with the TMS.

At 710, the TMS can receive a request from the first device. For example, an interface component of the TMS can receive a request from the first device to participate in an anonymous telecommunication.

At 715, the TMS can identify a configuration file for the first device. For example, a matching engine component of the TMS can identify first one or more characteristics stored in a first configuration file for the first device. The configuration file can be stored on the TMS, or stored on the device and provided by the device to the TMS along with the request or subsequent to the request.

At 720, the TMS can select a second device. For example, the matching engine component can select, from a pool of authenticated devices, a second device having second one or more characteristics stored in a second configuration file that matches the first one or more characteristics of the first device;

At 725, the TMS can initiate a telecommunication channel. For example, a connection engine component can initiate, responsive to selection of the second device, an anonymous telecommunication channel between the first device and the second device.

At 730, the TMS can configure a timer. For example, the connection engine component can configure a timer with a duration parameter that causes the anonymous telecommunication channel to terminate upon expiration of the timer to reduce resource consumption. The timer can be resettable to extend the anonymous telecommunication channel responsive to receiving an indication from both the first device and the second device.

The TMS can configure the channel with other parameters or modes. The TMS can configure the channel to listen only mode. In listen-only mode, one or more devices may be able to receive output from the channel, but not able to provide input to the channel. For example, two devices may participate in the channel and provide input and output. However, a third device may be able to only receive output, but not provide any input. Thus, the third device is only listening to the content input by the first two devices without providing its own input to the channel. The channel between the third device and the first device and second device can, thus, be listen only. When the third device joins the channel, the TMS can provide an indication to the first device or the second device indicating that a third device has joined in listen-only mode.

At 735, the TMS can update the configuration file. For example, a feedback module can update, upon termination of the anonymous telecommunication channel, the first configuration file for the first device and the second configuration file of the second device to tune the matching engine component.

While the invention has been particularly shown and described with reference to specific embodiments, it should be understood by those skilled in the art that various changes in form and detail may be made therein without departing from the spirit and scope of the invention described in this disclosure.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to embodiments or implementations or elements or acts of the systems, devices, or methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. For example, references to the data processing system 120 can include references to multiple physical computing devices (e.g., servers) that collectively operate to form the data processing system 120. References to any act or element being based on any information, act or element may include implementations where the act or element is based at least in part on any information, act, or element.

Any implementation or embodiment disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 13' can include only 'A', only 'B', as well as both 'A' and 'B'.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of managing telecommunication channels to reduce resource consumption, comprising:
    authenticating, by an authentication component of a telecommunication management system including a hardware processor, a first device responsive to receiving one or more credentials from the first device;
    receiving, by an interface component of the telecommunication management system, a request from the first device to participate in an anonymous telecommunication;
    identifying, by a matching engine component of the telecommunication management system, first one or more characteristics stored in a first configuration file for the first device;
    selecting, by the matching engine component, from a pool of authenticated devices, a second device having second one or more characteristics stored in a second configuration file that matches the first one or more characteristics of the first device;
    initiating, by a connection engine component of the telecommunication management system responsive to selecting the second device, an anonymous telecommunication channel between the first device and the second device;
    configuring, by the connection engine component, a timer with a duration parameter that causes the anonymous telecommunication channel to terminate upon expiration of the timer to reduce resource consumption, the timer resettable to extend the anonymous telecommunication channel responsive to receiving an indication from both the first device and the second device;
    receiving, by a feedback module of the telecommunication management system, one or more indications of feedback for the anonymous telecommunication channel; and
    updating, by the feedback module upon termination of the anonymous telecommunication channel and based on the one or more indications of feedback, at least one of the first one or more characteristics of the first configuration file for the first device and at least one of the second one or more characteristics of the second configuration file of the second device to tune the matching engine component and use, for subsequent selection processes, one or more updated configuration files associated with the first device or the second device updated by the feedback module.

2. The method of claim 1, comprising:
    providing, by the telecommunication management system, a selectable prompt for display on both the first device and the second device;
    receiving, by the telecommunication management system, a first indication from the first device to extend the anonymous telecommunication channel;
    identifying, by the telecommunication management system, a second indication from the second device to terminate the anonymous telecommunication channel; and
    terminating, by the telecommunication management system based on the second indication and the second indication, the anonymous telecommunication channel.

3. The method of claim 1, comprising:
    configuring, by the telecommunication management system, the anonymous telecommunication channel to enable a listen-only mode to allow one or more devices of the pool of authenticated devices to listen to the anonymous telecommunication channel.

4. The method of claim 1, comprising:
    receiving, by the telecommunication management system, input from the second device upon termination of the anonymous telecommunication channel; and
    updating, by the telecommunication management system, the first configuration file for the first device based on the input from the second device.

5. The method of claim 1, wherein initiating the anonymous telecommunication channel comprises:
    initiating, by the telecommunication management system, a first telecommunication link between the telecommunication management system and the first device;
    initiating, by the telecommunication management system, a second telecommunication link between the telecommunication management system and the second device; and
    bridging, by the telecommunication management system, the first telecommunication link and the second telecommunication link to establish the anonymous telecommunication channel.

6. The method of claim 1, wherein initiating the anonymous telecommunication channel comprises:
    instructing, by the telecommunication management system, an agent executing on the first device to communicate with an intermediary device different from the second device; and routing, by the intermediary device, communications with the first device to the second device to establish the anonymous telecommunication channel.

7. The method of claim 1, comprising:

removing, by the telecommunication management system, the second device from the pool of authenticated devices responsive to initiating the anonymous telecommunication channel between the first device and the second device.

8. The method of claim 1, comprising:

adding, by the telecommunication management system, the second device to a second pool of authenticated devices;

removing, by the telecommunication management system, the second device from the pool of authenticated devices responsive to initiating the anonymous telecommunication channel between the first device and the second device;

maintaining, by the telecommunication management system, the second device in the second pool of authenticated devices during the anonymous telecommunication channel; and providing, by the telecommunication management system, during the anonymous telecommunication channel, a selectable prompt to the second device to initiate a second anonymous telecommunication channel with a third device of the second pool of authenticated devices; and terminating, by the telecommunication management system responsive to receiving a selection via the selectable prompt, the anonymous telecommunication channel between the first device and the second device to initiate the second anonymous telecommunication channel between the second device and the third device.

9. The method of claim 1, comprising:

identifying, by the telecommunication management system, a plurality of available network interfaces for the first device; and selecting, by the telecommunication management system for the anonymous telecommunication channel, a network interface of the plurality of available network interfaces that reduces resource consumption.

10. The method of claim 1, comprising:

identifying, by the telecommunication management system, a first plurality of available network interfaces of the first device;

identifying, by the telecommunication management system, a second plurality of available network interfaces of the second device;

determining, by the telecommunication management system, a first available network interface of the first plurality of available network interfaces and a second available network interface of the second plurality of available network interfaces that satisfy a telecommunications metric; and initiating, responsive to the determination, the anonymous telecommunication channel between the first device and the second device using the determined first and second available network interfaces.

11. A system to manage telecommunication channels to reduce resource consumption, comprising:

a telecommunication management system comprising one or more processors, memory, and an interface to:

authenticate a first device responsive to receiving one or more credentials from the first device;

receive a request from the first device to participate in an anonymous telecommunication;

identify first one or more characteristics stored in a first configuration file for the first device; and select, from a pool of authenticated devices, a second device having second one or more characteristics stored in a second configuration file that matches the first one or more characteristics of the first device;

initiate, responsive to selection of the second device, an anonymous telecommunication channel between the first device and the second device; and configure a timer with a duration parameter that causes the anonymous telecommunication channel to terminate upon expiration of the timer to reduce resource consumption, the timer resettable to extend the anonymous telecommunication channel responsive to receiving an indication from both the first device and the second device;

receive one or more indications of feedback for the anonymous telecommunication channel; and update, upon termination of the anonymous telecommunication channel and based on the one or more indications of feedback, at least one of the first one or more characteristics of the first configuration file for the first device and at least one of the second one or more characteristics of the second configuration file of the second device to cause the telecommunication management system to use, for subsequent selection processes, one or more updated configuration files associated with the first device or the second device.

12. The system of claim 11, wherein the telecommunication management system is further configured to:

provide a selectable prompt for display on both the first device and the second device;

receive a first indication from the first device to extend the anonymous telecommunication channel;

identify a second indication from the second device to terminate the anonymous telecommunication channel; and terminate, based on the second indication and the second indication, the anonymous telecommunication channel.

13. The system of claim 11, wherein the telecommunication management system is further configured to:

configure the anonymous telecommunication channel to enable a listen-only mode to allow one or more devices of the pool of authenticated devices to listen to the anonymous telecommunication channel.

14. The system of claim 11, wherein the telecommunication management system is further configured to:

receive input from the second device upon termination of the anonymous telecommunication channel; and update the first configuration file for the first device based on the input from the second device.

15. The system of claim 11, wherein the telecommunication management system is further configured to:

initiate a first telecommunication link between the telecommunication management system and the first device;

initiate a second telecommunication link between the telecommunication management system and the second device; and bridge the first telecommunication link and the second telecommunication link to establish the anonymous telecommunication channel.

16. The system of claim 11, wherein the telecommunication management system is further configured to:

instruct an agent executing on the first device to communicate with an intermediary device different from the second device, the intermediary device configured to route communications with the first device to the second device to establish the anonymous telecommunication channel.

17. The system of claim 11, wherein the telecommunication management system is further configured to:
remove the second device from the pool of authenticated devices responsive to initiating the anonymous telecommunication channel between the first device and the second device.

18. The system of claim 11, wherein the telecommunication management system is further configured to:
add the second device to a second pool of authenticated devices;
remove the second device from the pool of authenticated devices responsive to initiating the anonymous telecommunication channel between the first device and the second device;
maintain the second device in the second pool of authenticated devices during the anonymous telecommunication channel; and
provide during the anonymous telecommunication channel, a selectable prompt to the second device to initiate a second anonymous telecommunication channel with a third device of the second pool of authenticated devices; and terminate, responsive to receiving a selection via the selectable prompt, the anonymous telecommunication channel between the first device and the second device to initiate the second anonymous telecommunication channel between the second device and the third device.

19. The system of claim 11, wherein the telecommunication management system is further configured to:
identify a plurality of available network interfaces for the first device; and
select, for the anonymous telecommunication channel, a network interface of the plurality of available network interfaces that reduces resource consumption.

20. The system of claim 11, wherein the telecommunication management system is further configured to:
identify a first plurality of available network interfaces of the first device;
identify a second plurality of available network interfaces of the second device;
determine a first available network interface of the first plurality of available network interfaces and a second available network interface of the second plurality of available network interfaces that satisfy a telecommunications metric; and
initiate the anonymous telecommunication channel between the first device and the second device using the determined first and second available network interfaces.

* * * * *